(12) United States Patent
Nishino

(10) Patent No.: US 9,123,214 B2
(45) Date of Patent: Sep. 1, 2015

(54) COMMODITY SALES DATA PROCESSING DEVICE

(71) Applicant: TERAOKA SEIKO CO., LTD., Tokyo (JP)

(72) Inventor: Kenichi Nishino, Kanagawa (JP)

(73) Assignee: TERAOKA SEIKO CO., LTD., Tokyo (JP)

( * ) Notice: Subject to any disclaimer, the term of this patent is extended or adjusted under 35 U.S.C. 154(b) by 0 days.

(21) Appl. No.: 14/563,316

(22) Filed: Dec. 8, 2014

(65) Prior Publication Data

US 2015/0170479 A1   Jun. 18, 2015

(30) Foreign Application Priority Data

Dec. 16, 2013   (JP) .................................. 2013-259641
Dec. 19, 2013   (JP) .................................. 2013-262981
May 27, 2014   (JP) .................................. 2014-109421
Oct. 29, 2014   (JP) .................................. 2014-220795

(51) Int. Cl.
*G07G 1/00*   (2006.01)
*G01G 23/44*   (2006.01)

(52) U.S. Cl.
CPC .............. *G07G 1/0072* (2013.01); *G01G 23/44* (2013.01)

(58) Field of Classification Search
USPC ....................... 235/380, 454, 375; 705/16, 23
See application file for complete search history.

(56) References Cited

U.S. PATENT DOCUMENTS

| 2002/0017564 A1* | 2/2002 | Larson et al. ................. 235/454 |
| 2002/0194074 A1* | 12/2002 | Jacobs ............................. 705/16 |
| 2007/0255665 A1* | 11/2007 | Oosugi et al. ................ 705/414 |
| 2014/0175164 A1* | 6/2014 | Allard ........................... 235/375 |
| 2014/0241583 A1* | 8/2014 | Connell et al. ............... 382/103 |

FOREIGN PATENT DOCUMENTS

JP   2013-108817   6/2013

* cited by examiner

*Primary Examiner* — Allyson Trail
(74) *Attorney, Agent, or Firm* — Greenblum & Bernstein, P.L.C.

(57) ABSTRACT

A commodity sales data processing device that processes sales data relating to a commodity includes a memorizing part (such as a RAM 3) that memorizes commodity data including unit mass information of a commodity, an imaging part that images a commodity, a quantity specifying part that specifies the number of commodities based on the picture data taken by the imaging part, a measuring part that measures the mass of the commodity, a number calculating part that calculates the number of commodities based on the mass of the commodity measured by the measuring part and the commodity data memorized in the memorizing part, a judging part that judges whether or not the number of commodities specified by the quantity specifying part and the number of commodities calculated by the number calculating part match, and an informing part that informs the result of judgment by the judging part.

8 Claims, 19 Drawing Sheets

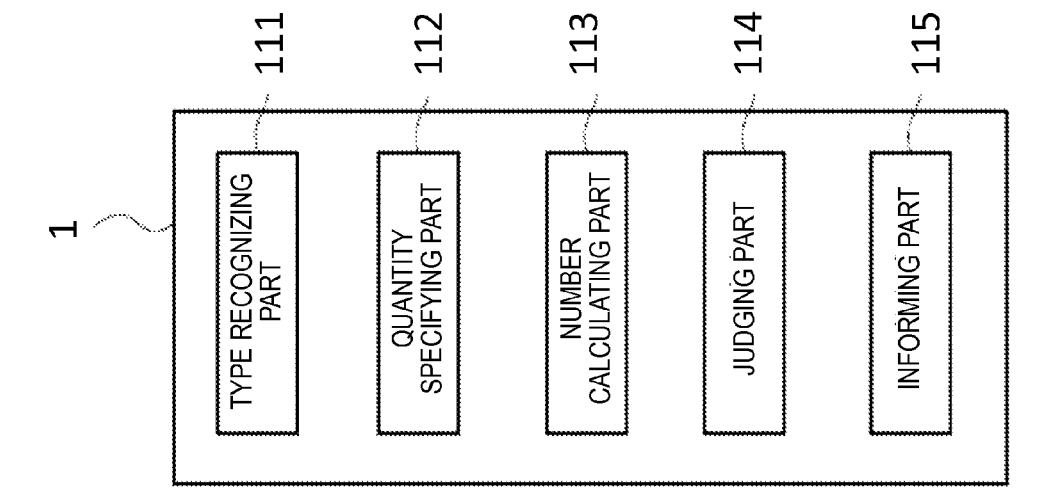
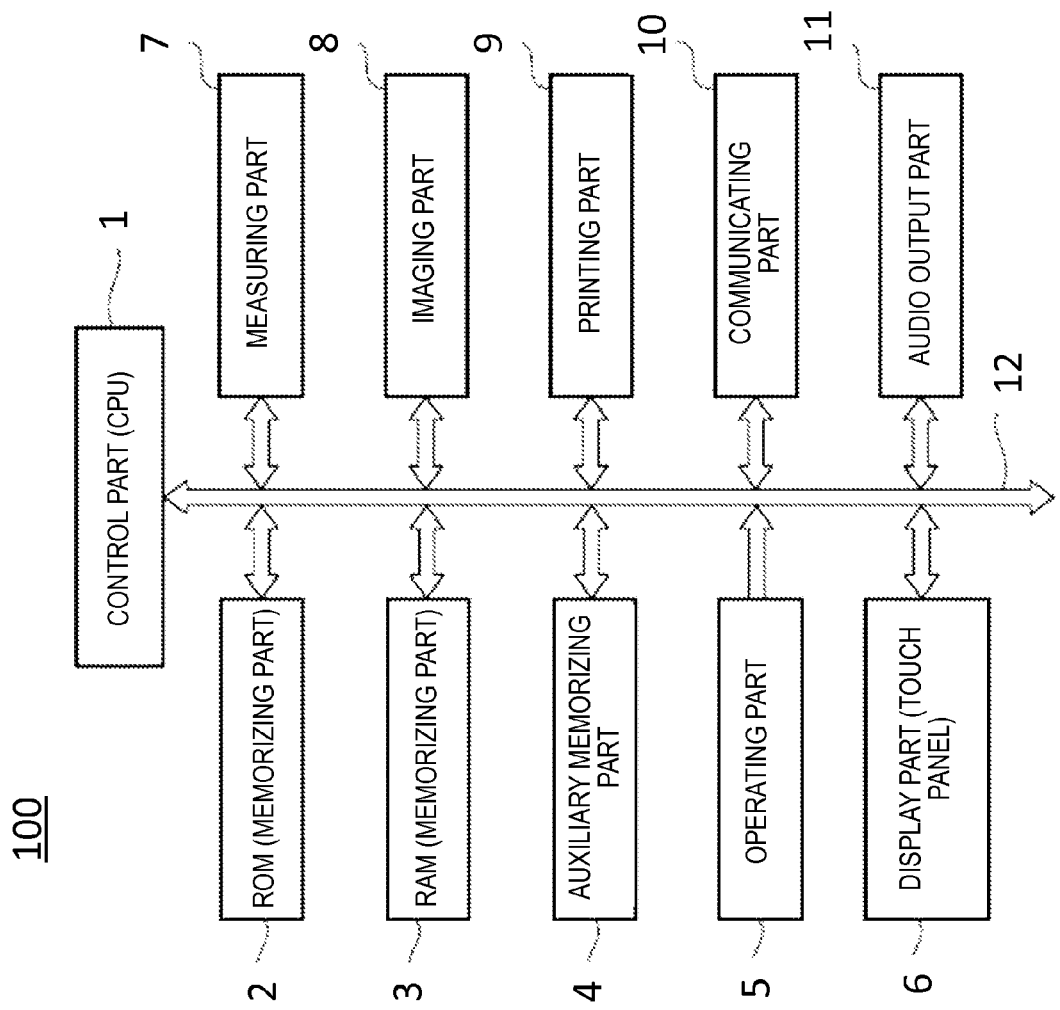

FIG. 4A    COMMODITY INFORMATION

| CATEGORY | COMMODITY CODE | COMMODITY NAME | COMMODITY SPECIFIC INFORMATION | ORIGIN OF PRODUCT | UNIT WEIGHT | STANDARD UNIT | CONTAINER CODE | UNIT PRICE |
|---|---|---|---|---|---|---|---|---|
| 01 | 001 | CROQUETTE | | HOMEMADE | 60g | PIECE | 1001 | 68 |
| 02 | 002 | SALAD | | HOMEMADE | NONE | g | 1002 | 98 |
| ... | ... | ... | ... | ... | ... | ... | ... | ... |

FIG. 4B    CONTAINER INFORMATION

| CONTAINER CODE | CONTAINER NAME | CONTAINER SPECIFIC INFORMATION | SALES TYPE | COMMODITY CODE |
|---|---|---|---|---|
| 1001 | RECTANGULAR CONTAINER | | 0 | 001 |
| 1002 | ROUND CONTAINER | | 1 | 002 |
| ... | ... | ... | ... | ... |

SALES TYPE (MEASUREMENT CATEGORY)
0 : WEIGHT DETERMINED (SOLD BY NUMBER)
1 : WEIGHT UNDETERMINED (SOLD BY MEASURE)

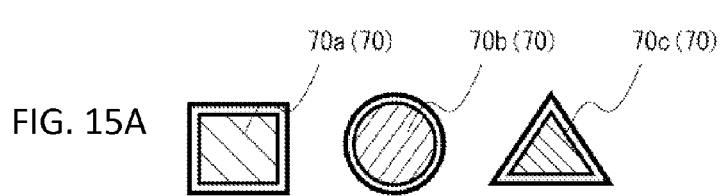
FIG. 15A
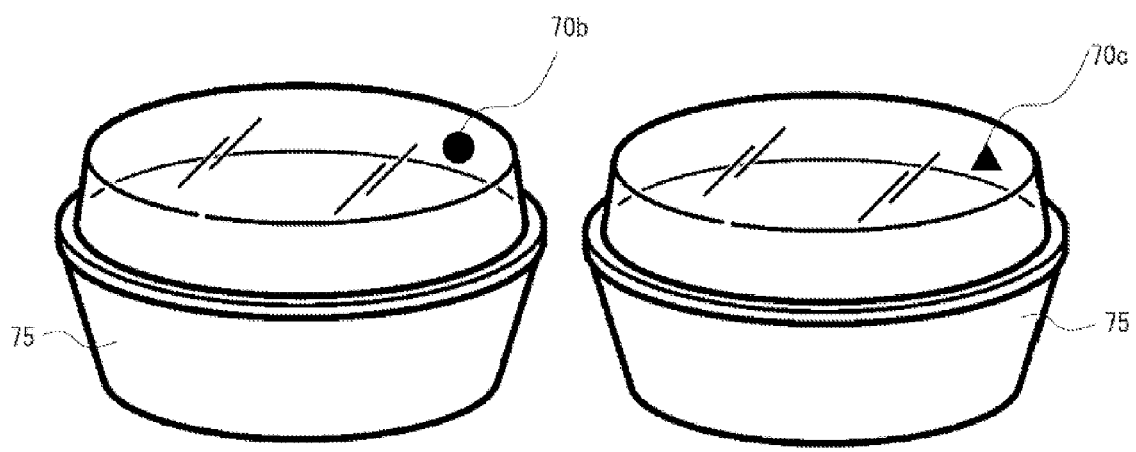
FIG. 15B
FIG. 15C

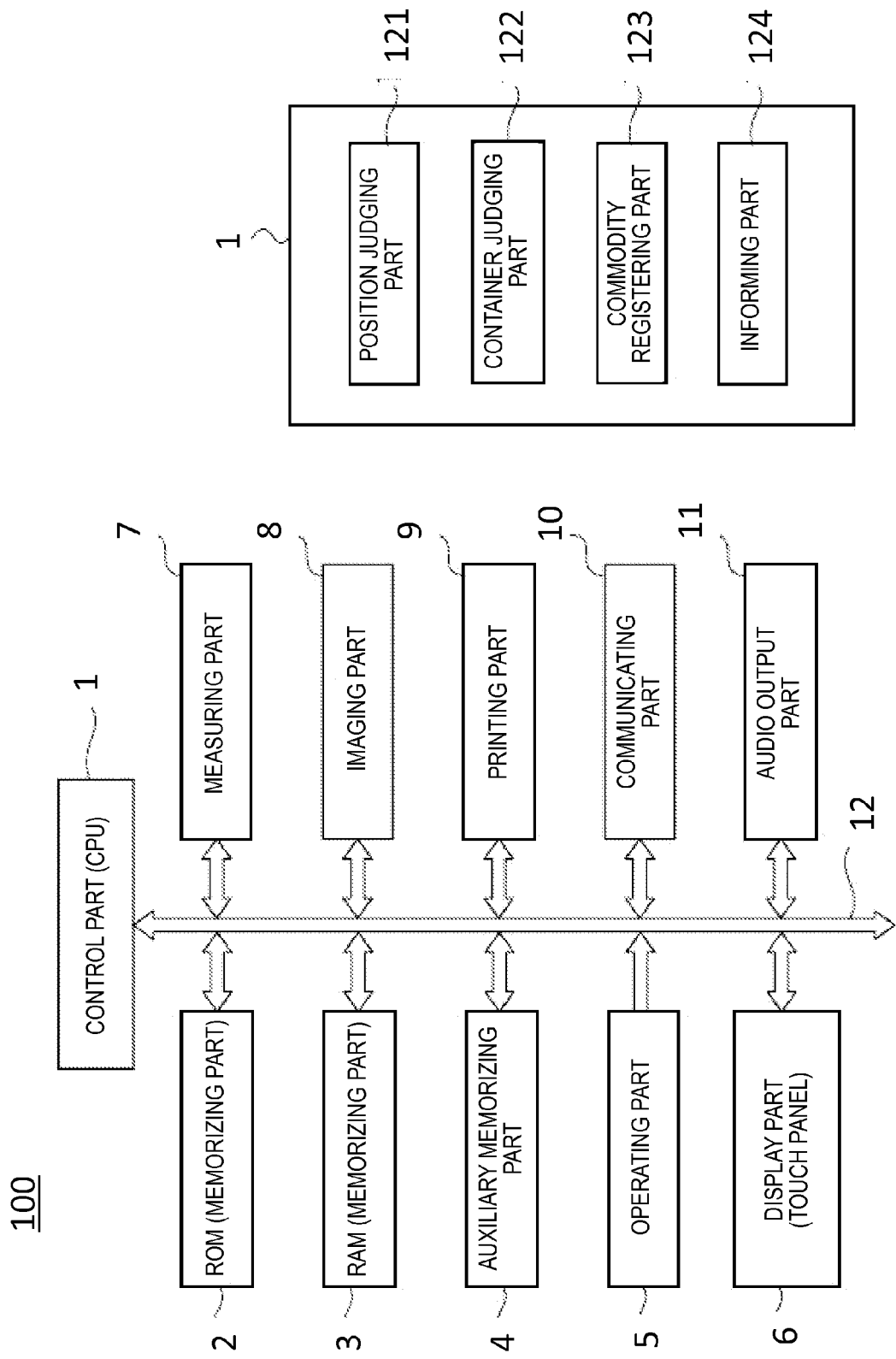

COMMODITY SALES DATA PROCESSING DEVICE

TECHNICAL FIELD

The present invention relates to a commodity sales data processing device.

RELATED ART

A camera-equipped self measuring device that measures a measurement object that is a tare selected by a customer in which a commodity selected by the customer is put is known (for example, see Japanese Patent Application Laid-open No. 2013-108817). The measuring device issues a label indicating the price of the commodity in accordance with the measurement result. The customer affixes the label on the tare and pays the price of the commodity at a checkout counter.

RELATED ART LITERATURE

Patent Literature

Patent Literature 1
Japanese Patent Application Laid-open No. 2013-108817

SUMMARY OF THE INVENTION

However, with a self measuring device that distinguishes the number of commodities with an imaging part such as, for example, a camera and issues a label indicating the price or the like of the commodity, a malfunction may occur in which the number of commodities is falsely recognized when a taken image is unclear, the number of commodities is not appropriate due to an improper action by a customer, or the like. With a general self measuring device, such an error in the number of commodities may not be detectable.

Conventionally, a customer (operator) has been required to perform a troublesome operation of switching respective modes of selling by measure and selling by number in a self measuring device in which modes of selling by measure and selling by number are switched based on the operation by the customer (operator), for example.

In a conventional registering device, the sales type for a commodity is operated and input by an operator. However, there is a problem of a mistake in operation occurring or the like, posing a problem that sales data is not correctly generated.

With a conventional camera-equipped measuring scale, it is necessary for a customer to place an article in the middle of a placing part of the measuring scale as much as possible, in order to increase the recognition rate of the article imaged by a camera.

However, with a conventional camera-equipped measuring scale or the like, there has only been guidance to a customer through an announcement in advertisement, a sticker, or the like to place an article in the middle of a placing part of the measuring scale as much as possible. There have been cases where a customer is unaware of the guidance in the advertisement, sticker, or the like and does not place a commodity in the middle of the placing part of the measuring scale. At such times, there have been cases where an article imaged by a camera cannot be recognized correctly, and a commodity cannot be registered correctly.

The present invention has been made in view of the problem described above and provides a commodity sales data processing device such as a self measuring device including an imaging part. An object the present invention is to provide, for example, a commodity sales data processing device capable of informing whether or not the number of commodities is appropriate, to provide a commodity sales data processing device capable of eliminating an operation input or mistake in operation of information relating to a commodity by an operator and generating correct sales data, and to provide a commodity sales data processing device that can inform a placing guidance about a commodity in order to place the commodity in approximately the center of a placing part, improve the recognition rate of a commodity, and perform commodity registration correctly.

In order to achieve such an object, a commodity sales data processing device of the present invention is provided with at least the following configuration.

A commodity sales data processing device that processes sales data relating to a commodity comprises:
 a placing part on which a commodity is placed;
 a measuring part that measures a mass of the commodity placed on the placing part;
 an imaging part that images the commodity placed on the placing part; and
 a control part that performs a process of registering the commodity based on the mass of the commodity measured by the measuring part and a picture taken by the imaging part.

With the present invention, a commodity sales data processing device, such as a self measuring device including an imaging part, capable of informing whether or not the number of commodities is appropriate can be provided.

With the present invention, a commodity sales data processing device that can prevent a mistake in operation input of information relating to a commodity by an operator and is capable of generating sales data reliably can be provided.

With the commodity sales data processing device of the present invention, a placing guidance about a commodity can be informed in order to place the commodity in approximately the center of a placing part and the recognition rate of a commodity can be improved. The commodity sales data processing device of the present invention can perform commodity registration correctly.

BRIEF DESCRIPTION OF THE DRAWINGS

FIGS. 3A and 3B are views showing an example of the commodity sales data processing device, FIG. 3A being a view showing an example of electrical functional blocks of the commodity sales data processing device, and FIG. 3B being a view showing an example of functional blocks of a control part;

FIGS. 4A and 4B are views showing an example of information memorized in the commodity sales data processing device, FIG. 4A being a view showing an example of commodity information, and FIG. 4B being a view showing an example of container information;

FIGS. 15A, 15B, and 15C are views for illustrating an example of specific information, FIG. 15A being a view showing an example of stickers in a color or shape prescribed as the specific information, and FIGS. 15B and 15C being views showing an example of containers to which a sticker is affixed;

FIGS. 16A and 16B are views showing an example of configurations of the commodity sales data processing device, FIG. 16A being an electrical functional block diagram, and FIG. 16B being a functional block diagram of a control part;

DETAILED DESCRIPTION OF THE EMBODIMENTS

Figure 1:
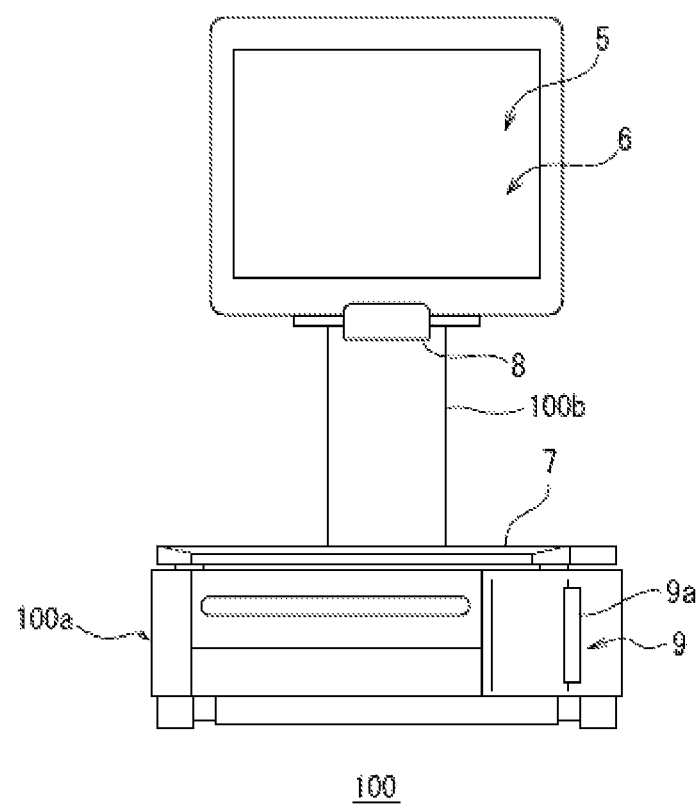
FIG. 1 is a front view showing an example of a commodity sales data processing device according to an embodiment of the present invention.

A commodity sales data processing device according to an embodiment of the present invention will be described with reference to the drawings. The embodiment of the present invention includes contents of the drawings but is not limited thereto. In the description of respective drawings below, portions common to parts already described are denoted by the same reference numerals, and redundant descriptions are partly omitted.

Embodiment 1

Figure 2:
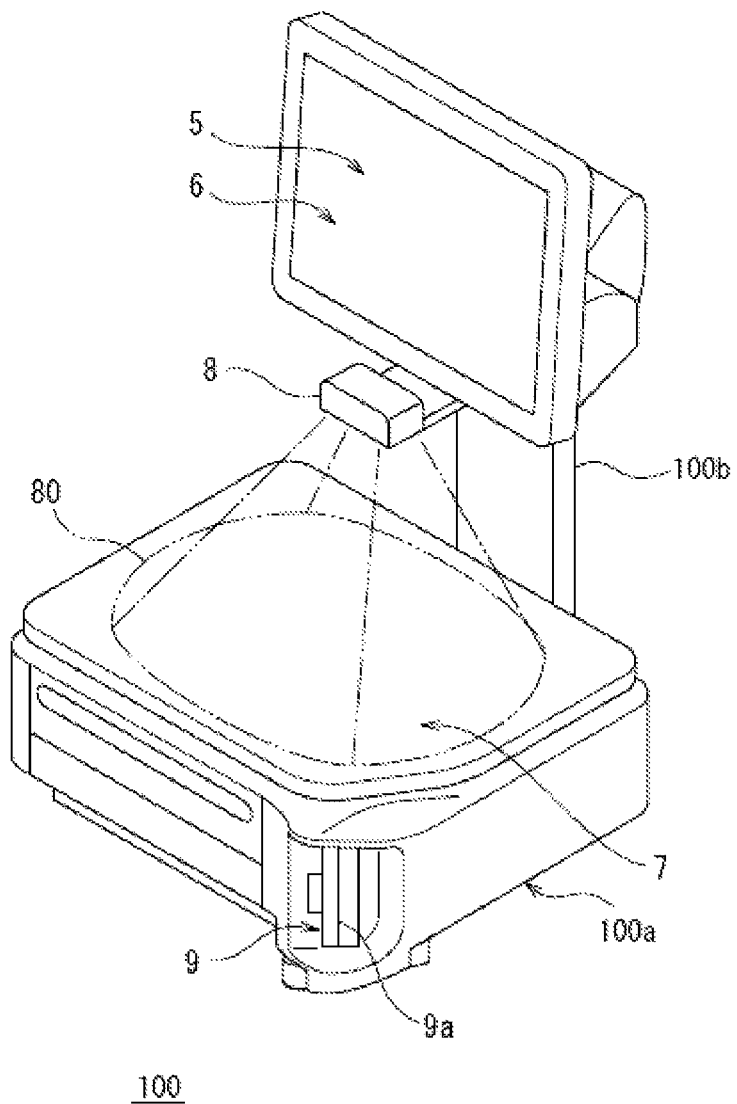
FIG. 2 is a perspective view showing an example of the commodity sales data processing device shown in FIG. 1.

FIG. 1 is a front view showing an example of a commodity sales data processing device 100 according to an embodiment of the present invention. FIG. 2 is a perspective view showing an example of the commodity sales data processing device 100. FIGS. 3A and 3B are views showing an example of the commodity sales data processing device 100. Specifically, FIG. 3A is a view showing an example of electrical functional blocks of the commodity sales data processing device 100, and FIG. 3B is a view showing an example of functional blocks of a control part 1.

In this embodiment, a case where the commodity sales data processing device 100 is applied to a self measuring device equipped with an imaging part (camera) will be described. The commodity sales data processing device 100 can be installed at a shop such as a supermarket, generate sales data of the type, number, price, or the like of a commodity, and register the sales data in a cash register machine, host computer, or the like. The commodity sales data processing device 100 includes a printing part 9 such as a printer and can issue a label in accordance with sales data with the printing part 9.

In this embodiment, commodities or the like such as hand-rolled sushi packaged one by one with a packaging film or the like are sold in the shop, for example. A customer selects one or a plurality of the commodities to be held in a container and places the container holding the commodity on a measuring plate or the like of a measuring part 7 of the commodity sales data processing device 100 that is the self measuring device equipped with an imaging part.

The commodity sales data processing device 100 specifies the type of commodity, the number for each type of commodity, or the like by performing a picture recognition process on picture data taken by an imaging part 8.

The commodity sales data processing device 100 measures the mass, including the mass of the container, of one or a plurality of commodities placed on the measuring plate of the measuring part 7, calculates the mass of the one or plurality of commodities by appropriately subtracting the mass of the container, and calculates the number of each commodity based on the mass. Information relating to the average mass per one of each commodity is memorized in a memorizing part or the like in advance. The commodity sales data processing device 100 compares the number of each commodity specified by picture recognition and the number of each commodity calculated based on the mass of the one or plurality of commodities placed on the measuring part 7 and informs the result of comparison.

The commodity sales data processing device 100 issues a label printed with the commodity, number of commodities, type of commodity, or the like. Information showing the result of comparison may be printed on the label for the informing by the commodity sales data processing device 100. The customer affixes the label to the container and pays the predetermined price at a location where the cash register machine is installed.

Each component of the commodity sales data processing device 100 (self measuring device) will be described below in detail.

The commodity sales data processing device 100 according to the embodiment of the present invention comprises the control part 1 (CPU), a ROM 2 and a RAM 3 as the memorizing part, an auxiliary memorizing part 4, an operating part 5, a display part 6, the measuring part 7, the imaging part 8, the printing part 9, a communicating part 10, an audio output part 11 (speaker), and the like. The respective components are electrically connected by a communication line 12 or the like such as a bus (see FIG. 3A and the like).

As shown in FIGS. 1 and 2, the measuring part 7 including the measuring plate (not shown) or the like is provided to a device main part 100a of the commodity sales data processing device 100. The device main part 100a is provided with the printing part 9 such as a printer. A label issued by the printing part 9 is discharged from a discharge opening 9a.

The upper part of the device main part 100a is provided with the operating part 5, the display part 6, and the like supported by a support column part 100b. In this embodiment, a touch panel device is employed as the operating part 5 or the display part 6. The operating part 5, the display part 6, or the support column part 100*b* is provided with the imaging part 8 that images a commodity (container) placed on the measuring plate (placing part (placing element)) or the like of the measuring part 7. An imaging range 80 (recognition range) of the imaging part 8 is set on the measuring part 7 (see FIG. 2).

When a commodity (container) placed on the measuring plate (placing part) or the like of the measuring part 7 is imaged by the imaging part 8, there are cases where the shape or color of the commodity (container), an affixed object affixed to the container, or the like cannot be recognized correctly from a picture of the commodity (container) including the background formed of the measuring plate (placing part) of the measuring part 7, imaged with reflected light that is light reflecting off the measuring plate (placing part) of the measuring part 7.

There is a method of performing baking finishing or lusterless painting in black on the measuring plate (placing part) of the measuring part 7, for example, in order to avoid such a situation. However, reflection of light cannot be prevented completely.

Therefore, as a method of preventing reflection of light completely (or a method of reducing reflection of light), a method of providing black fibers in a predetermined density on the measuring plate (placing part) of the measuring part 7 is employed. Specifically, as a technique of providing black fibers in the predetermined density on the measuring plate (placing part) of the measuring part 7, electrostatic flocking or flocking coating is performed.

Accordingly, regarding the measuring plate (placing part) of the measuring part 7, reflection of light can be prevented completely. Therefore, an effect that the shape or color of a commodity (container) can be recognized correctly from an imaged picture is obtained. Even in the case where an affixed object (e.g., a sticker of a figure or a label printed with code information) including identification information for identifying a container is affixed to the container, the affixed object can be recognized correctly.

It is effective also for a transparent container, and the shape or color of a commodity (transparent container) can be recognized correctly from an imaged picture.

It is possible to prevent reflection of light by wrapping or covering the measuring plate (placing part) of the measuring part 7 with a black sponge, cloth, or the like that is not reflective, for example, besides by electrostatic flocking or flocking coating.

A region for providing black fibers in a predetermined density on the measuring plate (placing part) of the measuring part 7 by electrostatic flocking or flocking coating is at least a region for imaging of a commodity (container) placed on the measuring plate (placing part) of the measuring part 7 by the imaging part 8. A region other than that for providing black fibers may be of a different material (e.g., in a state where normal plating process, baking finishing in black, or lusterless painting has been performed). Accordingly, the texture of the region for providing black fibers and other regions imaged by the imaging part 8 differ. Therefore, upon placing a container on the measuring plate (placing part) by a customer, the position of placement can be understood easily, and the container is prevented from being placed in a position that cannot be imaged by the imaging part 8. Accordingly, the container can be recognized and specified correctly from picture data that has been taken.

The control part 1 (CPU) takes overall control over respective components of the commodity sales data processing device 100.

The ROM 2 memorizes various programs, setting values, or the like according to the present invention. The RAM 3 includes a work area for executing a program. The RAM 3 as the memorizing part of this embodiment memorizes commodity data including at least unit mass information of a commodity.

The auxiliary memorizing part 4 is, for example, a memory device such as a detachable flash memory and is capable of saving setting information or the like relating to the commodity sales data processing device 100.

The operating part 5 is a switch, button, touch panel, or the like, operated by an operator (customer or the like), and outputs, to the control part 1, a signal in accordance with a predetermined operation input.

Under control of the control part 1, the display part 6 performs display according to the present invention. In this embodiment, the display part 6 of a touch panel-type is employed.

The measuring part 7 includes the measuring plate (placing part) or the like, measures the mass of a commodity placed on the measuring plate or the like, and outputs information showing the mass of the commodity (article) to the control part 1. The measuring plate of the measuring part 7 is preferably of a prescribed color, e.g., white. Accordingly, the recognition rate of a commodity placed on the measuring plate or the like or the shape or hue of a mark that is an identifier provided to a commodity can be increased, for example.

The measuring plate of the measuring part 7 is preferably formed with a concave part within the imaging range of the imaging part 8. The concave part of the measuring plate of the measuring part 7 functions as a guide for placing a commodity on the concave part and can increase the recognition rate of a commodity. The measuring plate of the measuring part 7 is not limited to the concave part and may be a convex part, line, or the like, as long as the configuration is such that the imaging range of the imaging part 8 (position where a commodity should be put) is directly or indirectly noticeable to an operator (customer).

The imaging part 8 images a commodity, article, container, or the like. In this embodiment, a commodity placed in the imaging range 80 (recognition range) on the measuring part 7 is imaged, and picture data is output to the control part 1. Examples of the imaging part 8 include a CCD imaging device and a CMOS imaging device.

A light emitting part such as light for illumination of the imaging range 80 (recognition range) may be provided in the vicinity of the imaging part 8.

Under control of the control part 1, the printing part 9 prints, on a label, sales data of a commodity (type, number, price, or the like of the commodity) in which an article is held in a container.

Under control of the control part 1, the communicating part 10 is capable of performing data communication with a computer such as a cash register machine or host computer via a wired or wireless communication path.

Under control of the control part 1, the audio output part 11 (speaker) is capable of emitting sound such as an operation guidance or error sound relating to the commodity sales data processing device 100 (self measuring device) at a predetermined timing.

The control part 1 (CPU) causes the commodity sales data processing device 100 as a computer to realize a function according to the present invention by executing a control program memorized in the memorizing part. As shown in FIG. 3B, the control part 1 includes a type recognizing part 111, a quantity specifying part 112, a number calculating part 113, a judging part 114, an informing part 115, and the like.

The type recognizing part 111 recognizes the type of commodity based on picture data taken by the imaging part 8. Specifically, the type recognizing part 111 checks type information of a commodity memorized in the memorizing part to perform a process of specifying the type of commodity, based on the color of the commodity, the shape of the commodity, the figure, character, or symbol that is on a sticker or directly printed on a package containing the commodity, or the like from an image of the commodity taken by the imaging part 8.

The quantity specifying part 112 specifies the number of commodities based on picture data taken by the imaging part 8.

The number calculating part 113 calculates the number of commodities based on the mass of a commodity measured by the measuring part 7 and commodity data memorized in the memorizing part.

The judging part 114 judges whether or not the number of commodities specified by the quantity specifying part 112 and the number of commodities calculated by the number calculating part 113 match.

The informing part 115 performs a process of informing the result of judgment by the judging part 114. Examples of the process by the informing part 115 include a process of informing the result of judgment by sound from the audio output part 11 such as speaker, a process of printing information showing the result of judgment on a label with the printing part 9, and a process of displaying the result of judgment with the display part 6.

FIGS. 4A and 4B are views showing an example of information memorized in the RAM 3 as the memorizing part of the commodity sales data processing device 100. Specifically, FIG. 4A is a view showing an example of commodity information, and FIG. 4B is a view showing an example of container information.

As the commodity information (article information), the category of a commodity, the commodity code (article code), the commodity name such as croquette or salad, the origin of product, unit weight (unit mass data), the standard unit, the container code, the unit price, and the like are associated and memorized.

In the case of specifying an article (commodity) with image data (picture data) in which the article (commodity) is imaged by the imaging part 8 (imaging element), the commodity information may further include commodity specific information (data in which the dimension, color, shape, or the like of a commodity is quantified) specifying the commodity.

As the container information, the container code, the container name (type of container) such as rectangular container or circular container, container specific information (specific information), sales type information, the commodity code (article code), mass data of a container (tare weight data or tare mass data), and the like are associated and memorized. The container specific information is information showing the area of a container (area of the container in the case where the container is imaged by the imaging part 8), the shape of the container, or the like. The information showing the shape or the like of a container is not limited to the shape, area, color, or the like when the container is imaged from above. For example, in the case of acquiring image data (picture data) in which the bottom part of an article (commodity) is imaged by the imaging part 8 (imaging element), the shape of the bottom part of a container, the area of the bottom part, the color of the bottom part, or the like is the container specific information (specific information). In the case where the imaging direction of the imaging part 8 (imaging element) is from the side end (on either the front, back, left, or right) of a container, the shape on the side end of the container, the area on the side end, the color on the side end, or the like is the container specific information (specific information). As the sales type information, 0 is shown in the case of selling by number, and 1 is shown in the case of selling by measure, for example. That is, the sales type information shows whether or not the sales type of the container is selling by measure. Setting of the container specific information is performed on a setting screen. An empty container placed on the placing part of the measuring part 7 is imaged by the imaging part 8, a binarization process is performed, and the area of the container is acquired. The acquired area is memorized as the container specific information (specific information) of the container in the memorizing part such as the RAM 3. The container specific information is not limited to the area and may be, for example, the number of dots into which the container is binarized or may be a combination of a plurality of the external shape (silhouette), the actual three-dimensional dimensions (length, width, and height), the color or design on the container surface, and the like.

In this embodiment, the type of container (tray) and the type of article held in the container (tray) are associated and memorized in the memorizing part. The type of container (tray) and the sales type information are associated and memorized in the memorizing part.

Figure 5:
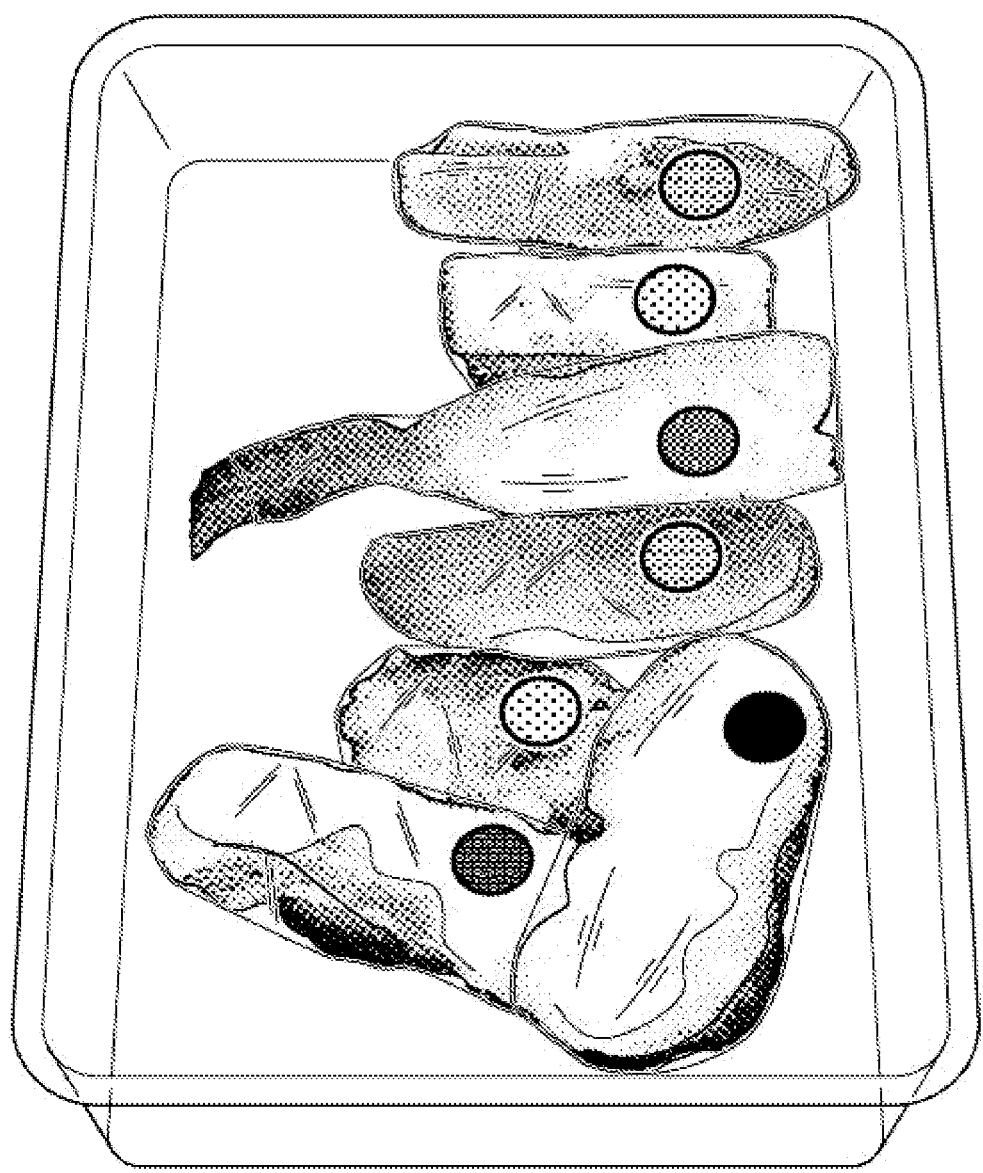
FIG. 5 is a view showing an example of a commodity held in a container used in the commodity sales data processing device.

FIG. 5 is a view showing an example of a commodity held in a container used for the commodity sales data processing device.

In this embodiment, one or a plurality of commodities or the like such as hand-rolled sushi packaged one by one by a packaging film or the like are selected and held in a container by a customer, and the container holding the commodity is placed on the measuring plate or the like of the measuring part. In this embodiment, a sticker (identifier) of a color prescribed in advance for each type of the respective commodities is affixed to be recognizable on the upper surface of the packaging film.

Figure 6:
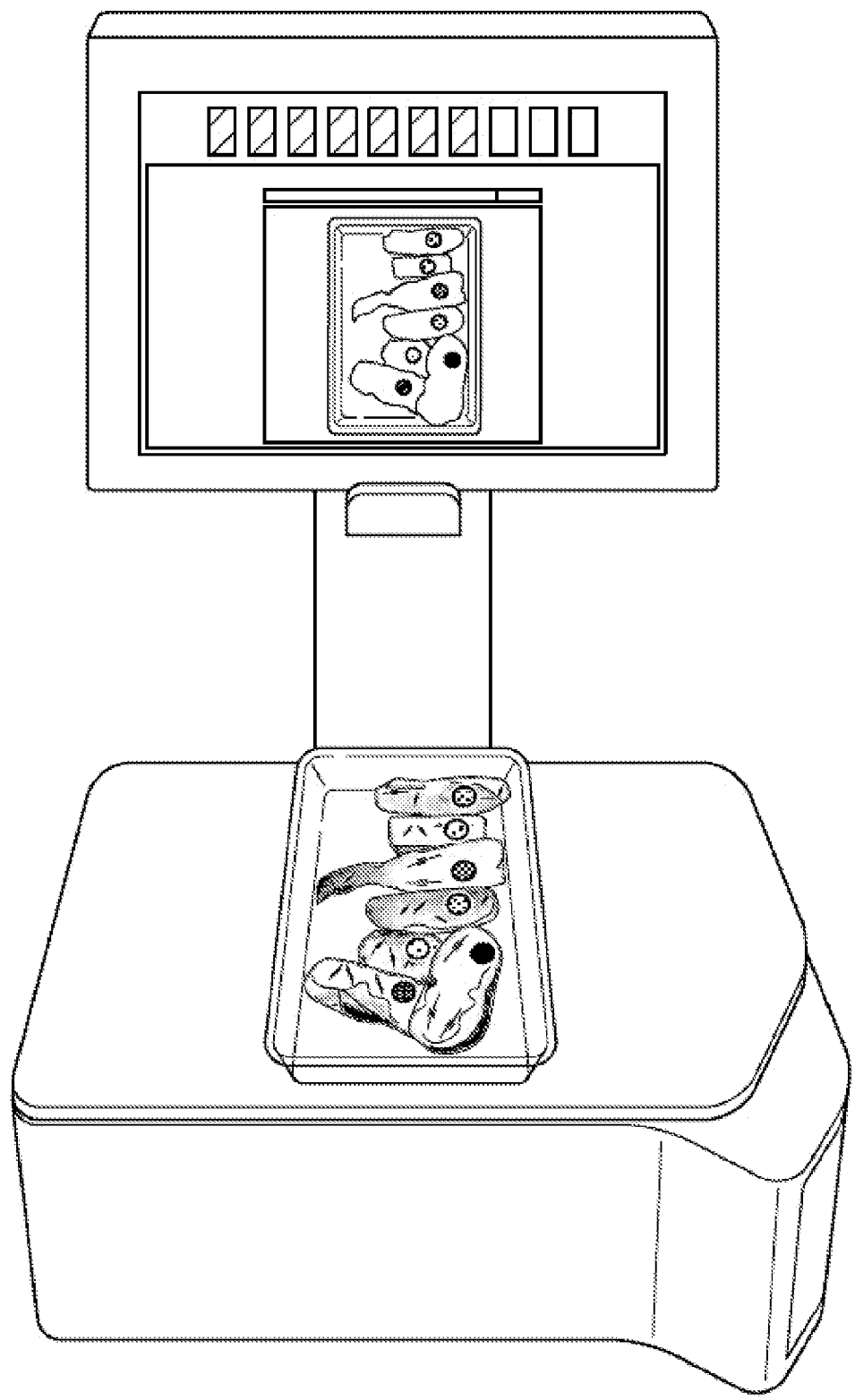
FIG. 6 is a view showing an example of an image displayed in a display part of the commodity sales data processing device.

FIG. 6 is a view showing an example of a picture displayed in the display part of the commodity sales data processing device.

In the case where a container holding a commodity is placed on the measuring plate of the measuring part, a picture of the imaged commodity, a progress bar showing the progress situation of a picture recognition process of the commodity, or the like is displayed in the display part.

Figure 7:
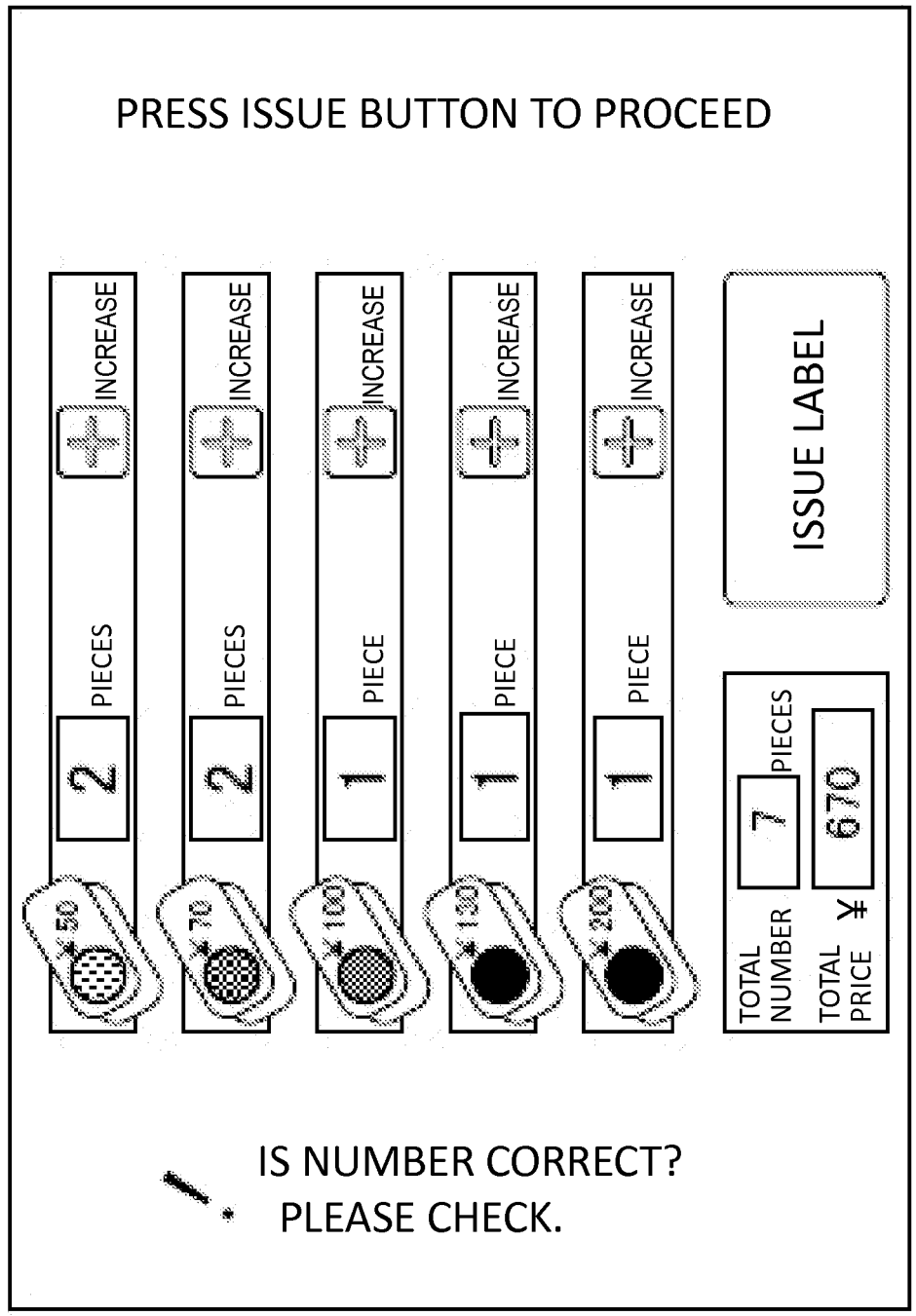
FIG. 7 is a view showing an example of a list of numbers of commodities and add buttons displayed in the display part of the commodity sales data processing device.

FIG. 7 is a view showing an example of a list of numbers of commodities and add buttons displayed in the display part of the commodity sales data processing device. In a picture shown in FIG. 7, the quantity of each type of commodity specified by picture recognition is displayed. In the picture shown in FIG. 7, a character, picture, or the like urging a customer to check the number of commodities such as "Is the number correct? Please check." is displayed. The configuration may be such that the character or picture urging checking of the number of commodities is displayed in the case where the number of commodities specified by the quantity specifying part and the number of commodities calculated by the number calculating part do not match.

In the picture shown in FIG. 7, an add button for adding to the number of commodities is displayed to be operable, in the case where it is judged by the judging part that the number of commodities specified by the quantity specifying part and the number of commodities calculated by the number calculating part do not match. Accordingly, a customer can easily adjust the number of commodities. The commodity sales data processing device may print a mark or symbol (such as +, −, or *) indicating that the number of commodities or the like has been altered by a customer for each type of commodity on a label issued by the printing part, in the case where the number of commodities or the like has been operated by the customer.

The configuration may be such that an add button or subtract button is displayed to be operable to provide a corresponding mark or symbol to a label, in the case where an operation of reducing the number of pieces of 130-yen sushi has been performed and an operation of increasing the number of pieces of 50-yen sushi has been performed, for example. In this case, the marks or symbols may be the same, or a mark "+," "−," or the like in accordance with the increase or decrease may be provided to the label.

In the picture shown in FIG. 7, an issue button for issuing a label is displayed to be operable.

Figure 8B:
FIGS. 8A and 8B are views showing an example of a label issued from a printing part of the commodity sales data processing device, FIG. 8A being a view showing an example of a label issued in the case where the number of commodities is distinguished as appropriate, and FIG. 8B being a view showing an example of a label issued in the case where the number of commodities is distinguished as not appropriate.
Figure 8A:
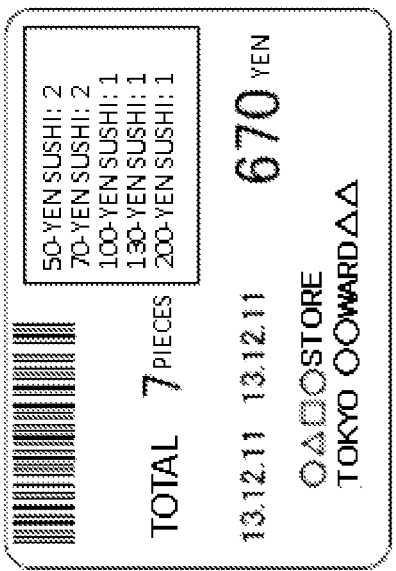

FIGS. 8A and 8B are views showing an example of a label issued from the printing part of the commodity sales data processing device. Specifically, FIG. 8A is a view showing an example of a label issued in the case where the number of commodities is distinguished as appropriate, and FIG. 8B is a view showing an example of a label issued in the case where the number of commodities is distinguished as not appropriate.

In the label shown in FIG. 8A, the number of each type of commodity, the number of all commodities, the date of packing, the expiration date, the price of commodity, the shop name, the shop address, and the like are stated.

In the label shown in FIG. 8B, the number of each type of commodity, the number of all commodities, the date of packing, the expiration date, the price of commodity, the shop name, the shop address, and the like are stated. Further, in the case where it is judged that the number of commodities specified by the quantity specifying part and the number of commodities calculated by the number calculating part do not match, in the case where the number of commodities has been altered and adjusted by an operator such as a customer, or the like, information (a mark or symbol such as "*" in the example shown in FIG. 8B) indicating that the numbers do not match is printed.

In this manner, in this embodiment, a mark or symbol showing that the number of commodities has been adjusted by an operator such as a customer is printed on a label, for example. Therefore, in the case where a clerk sees the mark or symbol on the label, it can be easily recognized that the number of commodities has been adjusted. Thus, there is an extremely effective checking function.

Figure 9:
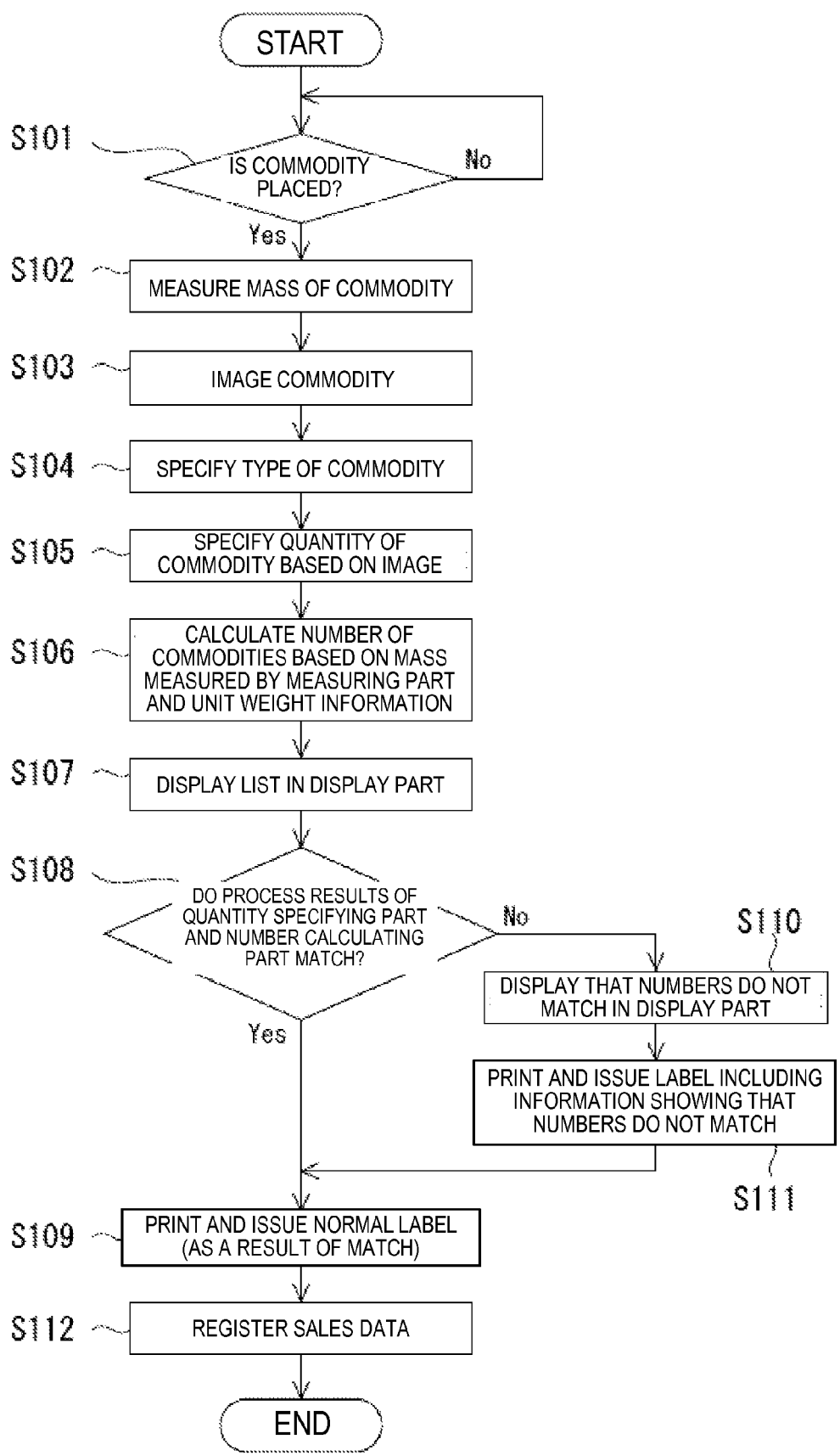
FIG. 9 is a flowchart showing an example of the behavior of the commodity sales data processing device.

FIG. 9 is a flowchart showing an example of the behavior of the commodity sales data processing device according to this embodiment. Referring to FIGS. 1 to 9, an example of the behavior of the commodity sales data processing device will be described.

In step S101, the control part 1 distinguishes whether or not a commodity has been placed on the measuring plate or the like of the measuring part 7 based on a signal from the measuring part 7 to proceed to a process of step S102 in the case where it is distinguished that a commodity has been placed or repeat a process of step S101 in the case where a commodity has not been placed.

In step S102, the mass of the commodity is measured by the measuring part 7, and the control part 1 receives information showing the mass of the commodity from the measuring part 7.

In step S103, the control part 1 performs a process of causing the imaging part 8 to image the commodity placed on the measuring plate or the like of the measuring part 7 and performs a process of receiving picture data from the imaging part 8.

In step S104, the type recognizing part 111 of the control part 1 performs a process of specifying the type of the commodity based on the picture data from the imaging part 8. Specifically, the control part 1 specifies the type of the commodity based on the picture data taken by the imaging part 8 and information specifying a commodity memorized in the memorizing part. As the information specifying a commodity, a commodity and color information are associated and memorized.

In step S105, the quantity specifying part 112 of the control part 1 performs a process of specifying the quantity of each commodity based on the picture data from the imaging part 8.

In step S106, the number calculating part 113 of the control part 1 performs a process of calculating the number of commodities based on the mass of the commodity measured by the measuring part 7 and commodity data memorized in the memorizing part.

In step S107, the control part 1 performs a process of displaying the specified number of commodities in the display part 6. In this embodiment, as shown in FIG. 7, the types of commodities and the numbers of the respective commodities are displayed in a list in the display part 6.

In step S108, the judging part 114 of the control part 1 judges whether or not the process results of the quantity specifying part 112 and the number calculating part 113 match. Specifically, the judging part 114 judges whether or not the number of commodities specified by the quantity specifying part 112 and the number of commodities calculated by the number calculating part 113 match to proceed to a process of step S109 in the case of a match or proceed to a process of step S110 in the case of a non-match.

In step S109, the control part 1 performs a process of issuing a normal label with the printing part 9 and proceeds to a process of step S112.

In step S110, the control part 1 performs a process of causing the display part 6 to display that the numbers do not match. Specifically, the control part 1 performs a process of displaying that the number of commodities specified by the quantity specifying part 112 and the number of commodities calculated by the number calculating part 113 do not match.

In step S111, the informing part 115 of the control part 1 performs a process of causing the printing part 9 to print that the numbers do not match. Specifically, the control part 1 performs a process of causing the printing part 9 to print that the number of commodities specified by the quantity specifying part 112 and the number of commodities calculated by the number calculating part 113 do not match. In this case, the informing part 115 may perform a process of printing information showing that the number of commodities has been altered by a customer on a medium with the printing part 9.

In step S112, the control part 1 performs a process of registering sales data. Specifically, the control part 1 performs a process of memorizing sales data in the memorizing part such as the RAM 3, a process of registering sales data in a cash register machine, host computer, or the like via the communicating part 10, or the like.

A buyer (customer) of the commodity affixes the label to a container and pays a predetermined price via a clerk or directly with a self cash register machine at a location (checkout counter) in which the cash register machine is installed.

In the case where a clerk has been able to notice information on a label showing that the number is not appropriate or information showing that the number of commodities has been altered and adjusted by an operator such as a customer with visual checking, a barcode reading device, or the like, the type of commodity or the number of commodities can be checked for correction.

As described above, the commodity sales data processing device 100 according to this embodiment is a self measuring device comprising the imaging part 8 and is capable of processing sales data relating to a commodity and informing whether or not the number of commodities is appropriate. Specifically, the commodity sales data processing device 100 includes the RAM 3 and the ROM 2 as the memorizing part that memorizes commodity data including unit mass information of a commodity, the imaging part 8 that images a commodity, the quantity specifying part 112 that specifies the number of commodities based on picture data taken by the imaging part 8, the measuring part 7 that measures the mass of a commodity, the number calculating part 113 that calculates the number of commodities based on the mass of the commodity measured by the measuring part 7 and the commodity data memorized in the memorizing part, the judging part 114 that judges whether or not the number of commodities specified by the quantity specifying part 112 and the number of commodities calculated by the number calculating part 113 match, and the informing part 115 that informs the result of judgment by the judging part 114. Examples of the process by the informing part 115 include a process of informing the result of judgment by sound from the audio output part 11 such as a speaker, a process of printing information showing the result of judgment on a label with the printing part 9, and a process of displaying the result of judgment with the display part 6.

That is, with the informing part 115, the commodity sales data processing device 100 can be provided to be capable of informing whether or not the number is appropriate, based on the number of commodities obtained based on picture data taken by the imaging part 8 and the number of commodities calculated based on the mass of a commodity or the like measured by the measuring part 7.

The commodity sales data processing device 100 according to the embodiment of the present invention includes the display part 6 that displays the add button for adding to the number of commodities such that the add button is operable, in the case where it is judged by the judging part 114 that the number of commodities specified by the quantity specifying part 112 and the number of commodities calculated by the number calculating part 113 do not match. Specifically, the control part 1 performs a process of causing the display part 6 to display the add button for adding to the number of commodities such that the add button is operable.

In this manner, in the case where the numbers do not match based on the number of commodities obtained based on picture data taken by the imaging part 8 and the number of commodities calculated based on the mass of a commodity or the like measured by the measuring part 7, corresponding display is done by the display part 6 to urge a customer (operator) to compare the actual number of commodities and the number of commodities specified by the commodity sales data processing device 100. Then, an adjust button for adjusting the number of commodities is displayed in the display part 6 to be operable. The customer (operator) operates the adjust button to adjust the number of commodities, in the case where the number of commodities displayed in the display part 6 is decided as not appropriate, for example. The control part 1 can adjust the number of commodities based on the operation of the adjust button by the customer (operator).

In the case where it is judged by the judging part 114 that the number of commodities specified by the quantity specifying part 112 and the number of commodities calculated by the number calculating part 113 do not match, the control part 1 preferably first performs a process of causing the display part 6 to display the add button for adding to the number of commodities such that the add button is operable. Accordingly, adjustment to add to the number of commodities recognized by the commodity sales data processing device 100 up to an appropriate number can be performed by a customer (operator).

The control part 1 may perform a process of displaying the subtract button for subtracting from the number of commodities in the display part 6 such that the subtract button is operable. The control part 1 performs a process of subtracting from the number of commodities, in the case where an operation of the subtract button has been detected. The control part 1 performs a process of prohibiting a number less than the number of commodities recognized by the commodity sales data processing device 100, even in the case where an operation of the subtract button has been detected. Accordingly, an operation to improperly reduce the number of commodities by a customer (operator) can be prevented.

It is preferable to perform the process of displaying the subtract button in the display part 6 to be operable, only in the case where the number of commodities recognized by the commodity sales data processing device 100 is added to by an operation by a customer.

In the embodiment of the present invention, the informing part 115 performs a process of printing information showing that the numbers do not match on a medium with the printing part 9. For example, information showing that the numbers do not match may be printed on paper or the like with the printing part 9 to issue a label.

The informing part 115 may perform a process of printing information showing that the number of commodities has been altered by a customer on a medium with the printing part 9.

As a specific example of the information printed on a medium by the printing part 9, there may be a symbol, character, figure, barcode, two-dimensional barcode, or the like that is comprehensible only to a clerk of that shop and not comprehensible at a glance to a customer.

A customer affixes a printed label (medium) to a container or the like and performs payment at a checkout counter. In that case, a clerk can see a symbol, character, figure, or the like printed on the label affixed to the container to recognize that the number of commodities from picture recognition and the number of commodities calculated based on the result of measurement by the measuring part 7 do not match, that the number of commodities recognized by the commodity sales data processing device 100 has been altered, or the like through the commodity sales data processing device 100.

The information may be printed on a label in a form such as a barcode that is readable by a barcode reading device (machine) and of which the content is not readable by a human at a glance.

The commodity sales data processing device 100 according to the embodiment of the present invention includes the type recognizing part 111 that recognizes the type of commodity based on the picture data taken by the imaging part 8. Therefore, the type recognizing part 111 can specify the number of each type of commodity, based on the picture data obtained through imaging of a commodity by the imaging part 8.

In the embodiment of the present invention, a commodity is provided with an identifier such as a predetermined color or predetermined shape that is prescribed for each type of commodity. Specifically, a sticker or the like printed with an identifier is affixed to a commodity. Based on the color, shape, or the like of an identifier provided to a commodity, the quantity specifying part 112 specifies the number of commodities by performing a picture recognition process on picture data in which the commodity and the identifier are imaged by the imaging part 8. Therefore, the identification accuracy of a commodity is increased by the imaging part 8 reading an identifier (such as the color or shape of a mark) of which the picture recognition rate is higher compared to the color or shape of a commodity itself in which an individual difference easily occurs, for example.

The brightness value of each color of each pixel of picture data taken by the imaging part 8 changes greatly, depending on a change in external environment such as morning, day, or night. For calibration in this embodiment, correction of the brightness value of each color is performed using a standard for reference in advance. Specifically, for example, a standard is imaged by the imaging part 8 in each time period, and a correction value for correcting the brightness value of each color is specified and memorized in the memorizing part based on picture data. The control part 1 can reliably specify the type of commodity, the number of commodities, or the like from a picture by correcting the brightness value of each color using the correction value of each time period that is memorized in the memorizing part.

In the embodiment, a commodity held in a container is imaged by the imaging part 8. However, the form is not limited as such. For example, the form may be such that a commodity is placed directly on the measuring plate of the measuring part 7 without using a container, the commodity is held in the container after measuring or imaging is performed by the measuring part 7 or the imaging part 8 and a label is issued, and the issued label is affixed to the container.

In the embodiment, in the case where, for example, it is judged that the number of commodities specified by the quantity specifying part 112 and the number of commodities calculated by the number calculating part 113 do not match or in the case where the number of commodities has been altered and adjusted by an operator such as a customer, information (such as a mark or symbol) indicating that the numbers do not match is printed on a label. However, the form is not limited as such.

For example, in the case where the number of commodities specified by the quantity specifying part 112 and the number of commodities calculated by the number calculating part 113 do not match or in the case where the number of commodities has been altered and adjusted by an operator such as a customer, the commodity sales data processing device may print a barcode (extended barcode), two-dimensional barcode, or the like including information indicating that the numbers do not match, on a label. A barcode reading device such as a cash register may perform a process of reading the barcode (extended barcode), two-dimensional barcode, or the like printed on the label and informing correspondingly based on the information.

Specifically, it may be such that a sequence of numbers of a predetermined number of digits such as seven digits is embedded in the barcode or two-dimensional barcode printed on a label to prescribe "No error. Do not inform at cash register." in the case where the value of a predetermined digit is "0" and "Error due to some change or the like. Inform at cash register." in the case where the value of a predetermined digit is "1," for example.

The configuration may be such that, for example, informing in accordance with the type of informing is performed at a cash register, such as "No error. Do not inform at cash register." in the case where the value of a predetermined digit is "0," "The number of commodities or price is smaller than the original value (there is a possibility of loss on the shop side). Inform correspondingly at cash register." in the case where the value of a predetermined digit is "1," and "The number of commodities or price is greater than the original value (there is a possibility of loss on the customer side). Inform correspondingly at cash register." in the case where the value of a predetermined digit is "2." Accordingly, a clerk operating the cash register can understand the situation easily and reliably.

Embodiment 2

Next, a commodity sales data processing device according to Embodiment 2 will be described. In the description of respective drawings below, portions common to parts already described are denoted by the same reference numerals, and redundant descriptions are partly omitted.

The commodity sales data processing device 100 according to this embodiment can be installed in a shop such as a supermarket, generate sales data such as the type, price, or the like of a commodity in which an article is held in a container, and register the sales data in a cash register machine, host computer, or the like. In the shop, commodities sold by measure such as salad, commodities sold by number such as a croquette, and the like are sold.

The commodity sales data processing device 100 (self measuring device) according to the embodiment of the present invention automatically distinguishes the sales type as a commodity sold by measure or a commodity sold by number to generate sales data of the commodity, when the commodity is placed on a measuring plate or the like of the measuring part 7 of the self measuring device, without an operator (customer) performing an operation input of designating whether the sales type is selling by measure or selling by number. The commodity sales data processing device 100 issues a label printed with information in accordance with the sales type of the commodity. The customer affixes the label to a container and pays a predetermined price at a location where the cash register machine is installed.

Each component of the commodity sales data processing device 100 (self measuring device) according to this embodiment will be described below in detail.

Figure 10:
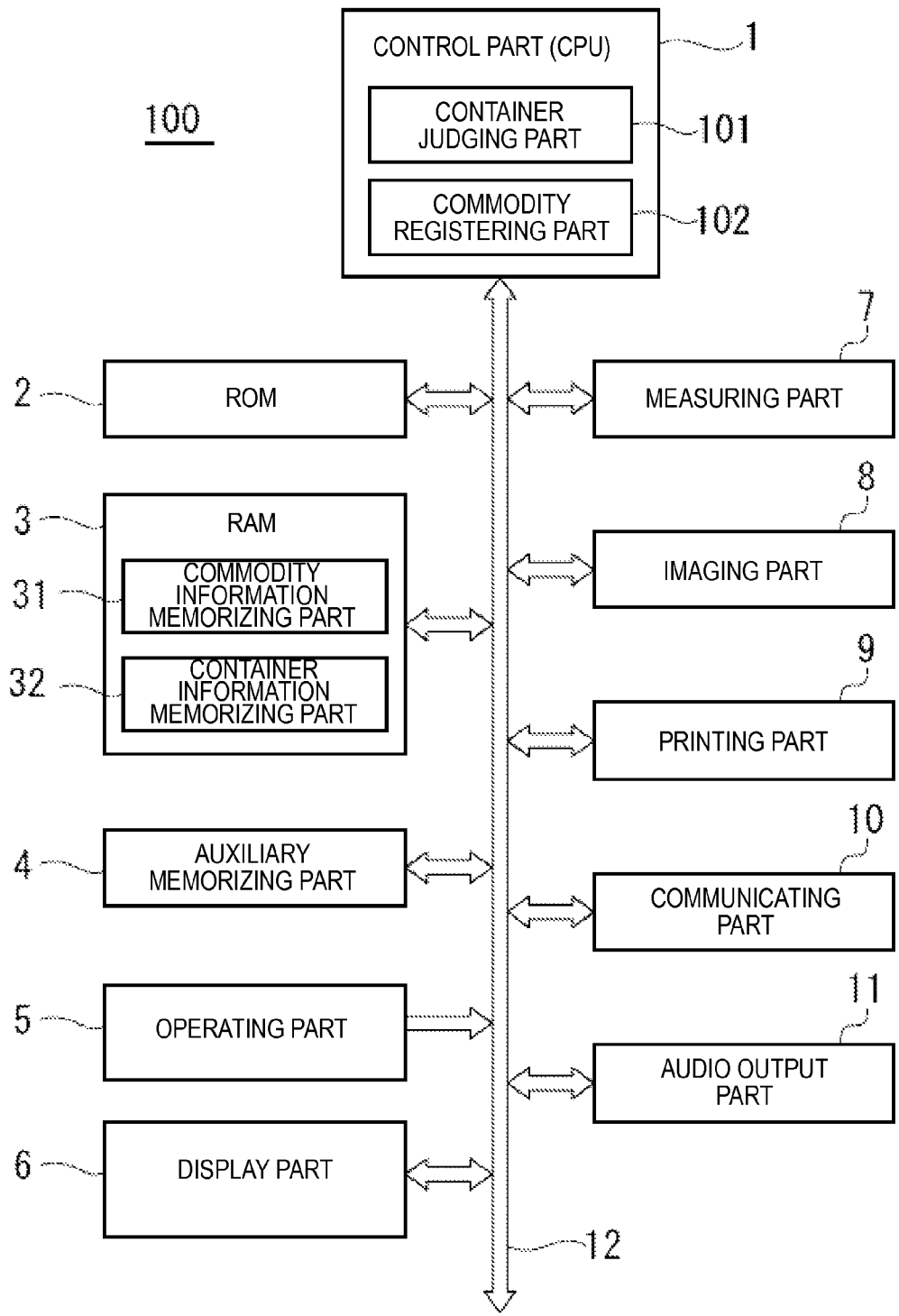
FIG. 10 is an electrical functional block diagram of a commodity sales data processing device according to Embodiment 2.

FIG. 10 is an electrical functional block diagram of the commodity sales data processing device according to Embodiment 2 of the present invention.

In this embodiment, the RAM 3 as a memorizing part includes a commodity information memorizing part 31, a container information memorizing part 32, and the like.

The commodity information memorizing part 31 memorizes the unit price or the like of an article. The container information memorizing part 32 associates and memorizes specific information showing whether the sales type of an article held in a container is selling by measure or selling by number, i.e., specific information (such as the area or shape of the container when seen from the imaging part 8 side) specifying the container as container information, mass data of the container, and the like.

The specific information includes a state such as the area of a container (number of dots or the like corresponding to the area of the container), the shape or color of a sticker on (affixed to) a container, or a label (sticker) printed with identification information (e.g., code information) for identification of a container. The control part 1 can distinguish whether the container is for a commodity sold by measure or a commodity sold by number, based on the specific information.

The RAM 3 as the memorizing part memorizes image data (picture data) of a container (commodity) imaged by the imaging part 8.

As shown in FIG. 10, the control part 1 according to this embodiment includes a container judging part 101 (container judging element), a commodity registering part 102 (commodity registering element), and the like.

The container judging part 101 specifies a container imaged by the imaging part 8 based on image data of the container imaged by the imaging part 8 and the specific information specifying the container and judges the sales type of the specified container as selling by measure or otherwise, specifically, as selling by measure or selling by number.

The commodity registering part 102 generates and registers sales data of a commodity based on mass data of an article or the like measured by the measuring part 7, in the case where the sales type of a container specified by the container judging part 101 is for a commodity sold by measure. The commodity registering part 102 generates and registers sales data of a commodity based on the sales type of a container specified by the container judging part 101, mass data of the commodity measured by the measuring part 7, and the unit price of an article memorized in the commodity information memorizing part 31.

The commodity registering part 102 performs a process of generating and registering sales data based on mass data in which mass data of a container is subtracted from mass data of the container holding an article measured by the measuring part 7 and the unit price of the article.

In a process of specifying a container holding an article with the container judging part 101, the control part 1 performs a process in which a plurality of candidates for the type of container memorized in the memorizing part such as the RAM 3 are displayed to be selectable in the touch panel-type display part 6, in the case where specific information specifying the container that is memorized in the container information memorizing part 32 does not include information corresponding to the container of a commodity imaged by the imaging part 8.

Figure 11:
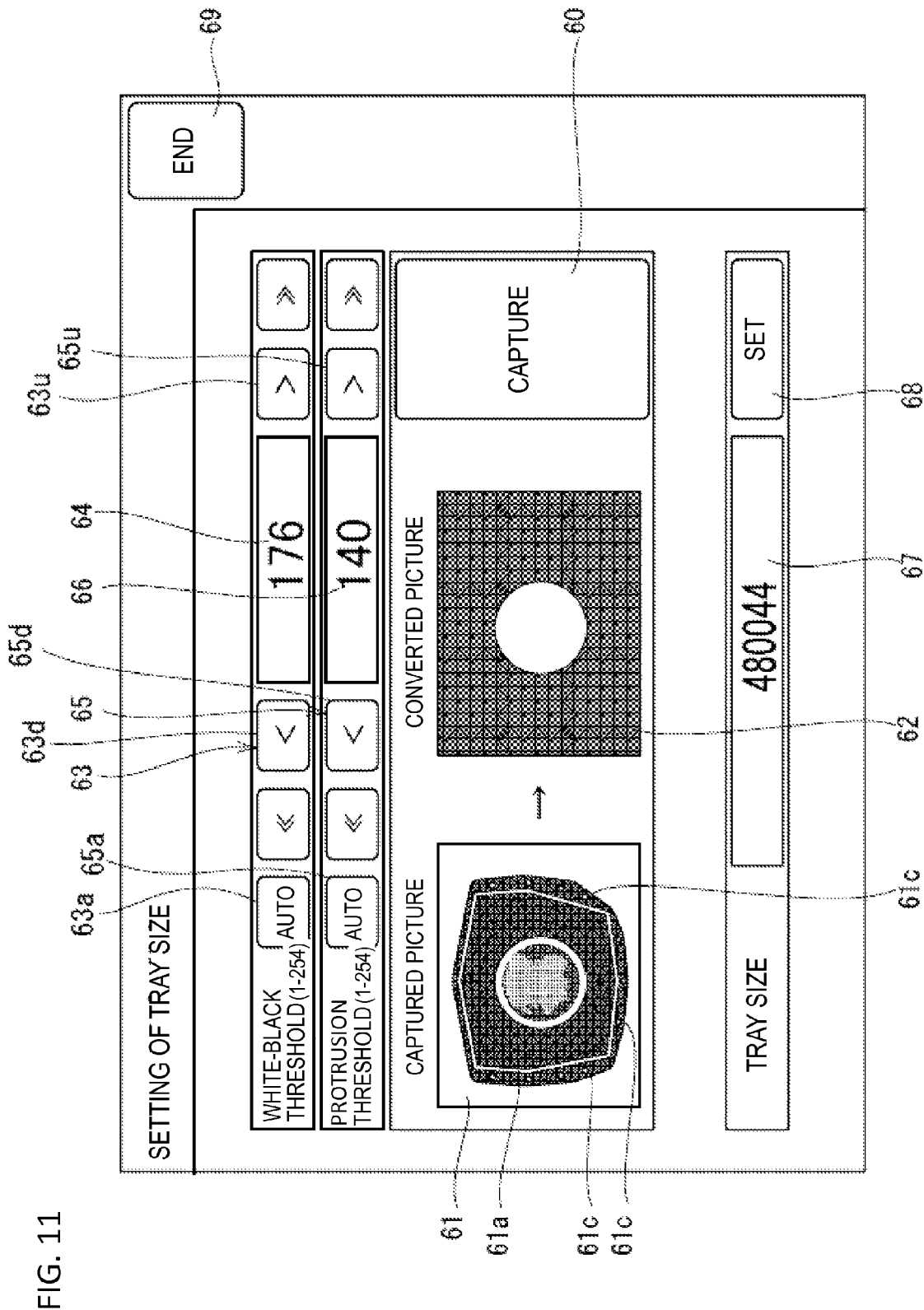
FIG. 11 is a view showing an example of a setting screen of the commodity sales data processing device.

FIG. 11 is a view showing an example of a setting screen of the commodity sales data processing device 100. Specifically, an example of a screen for setting information relating to a container such as the size of a tray (container) is shown.

The setting screen includes a capture button 60, a picture (captured picture 61) of a commodity or the like imaged by the imaging part, a binary coded picture (converted picture 62) obtained by performing a binary coded process based on a set threshold on the picture (captured picture 61), a plurality of operation buttons 63 for setting the threshold for the binary coded process, a threshold display part 64 that displays the threshold, a plurality of operation buttons 65 for setting a protrusion threshold, a protrusion threshold display part 66 that displays the protrusion threshold, a tray size display part 67 that shows the size of a tray (container), a setting button 68 for setting the size of the tray (container), an end button 69 for ending the setting, and the like.

The tray size display part 67 displays the number of pixels of a portion (white portion in FIG. 11) corresponding to a tray (container) or the area of the tray (container) within the binary coded picture (converted picture 62).

By operating an up button 63*u* or a down button 63*d* relating to the binary coded process, the threshold for the binary coded process can be finely adjusted manually. In the case where an automatic setting button 63*a* for automatically setting the threshold for the binary coded process has been operated, a prescribed threshold is set based on the illuminance (brightness) or the like of the surrounding environment.

By operating an up button 65*u* or a down button 65*d* relating to the protrusion threshold, the protrusion threshold can be finely adjusted manually. In the case where an automatic setting button 65*a* for automatically setting the protrusion threshold has been operated, a prescribed protrusion threshold is set based on the illuminance (brightness) or the like of the surrounding environment.

In the case where the capture button 60 has been operated, the captured picture 61 of a container or the like imaged by the imaging part is displayed, and the binary coded picture (converted picture 62) obtained by performing the binary coded process on the captured picture 61 based on a set white-black threshold is displayed.

The tray size display part 67 displays the number of pixels of the portion (white portion in FIG. 11) corresponding to the tray (container) or the area (container specific information) of the tray (container).

In the case where the setting button 68 has been operated, the area or the like of the tray (container) displayed in the tray size display part 67 and the set type of the set tray (container) are associated and memorized in the memorizing part such as the RAM 3.

As shown in FIG. 11, a recognition range 61*a* of a commodity is set in the picture (captured picture 61). The recognition range 61*a* is preferably set to correspond to the edge or the like of the measuring plate of the measuring part, for example. The control part decides that the container of the commodity cannot be specified accurately and performs an error process, in the case where the commodity is not within the recognition range 61*a*, in the case where a hand of an operator or the like appears in the captured picture 61, or the like. Examples of the error process by the control part include a process of performing display showing an error in the display part and a process of causing the display part to display a prompt to place the commodity within the recognition range 61*a*.

Specifically, in this embodiment, a plurality of protrusion detecting parts 61*c* are provided around the recognition range 61*a*. The control part 1 decides that there is an error, such as the commodity not being within the recognition range 61*a* or a hand of an operator or the like appearing in the captured picture 61, and performs the error process, in the case where the pixel value of the protrusion detecting part 61*c* is greater than or equal to the threshold.

The control part 1 decides that there is an error and performs the error process, in the case where the pixel value of the protrusion detecting part 61*c* is greater than or equal to the threshold. However, as the error process, a process of causing the display part to display a container selection screen may be performed. In the container selection screen, a picture or the like showing a plurality of types of containers memorized in the memorizing part is displayed. An operator (such as a user) looks at the container selection screen displayed in the display part and selects a container of the same type as the actual one. The control part 1 performs a process of specifying the container based on a signal input from an operation part. Accordingly, the control part 1 can easily specify the container based on the signal from the operation part, even in the case of an error in a picture recognition process.

In the case of detecting an error with the plurality of protrusion detecting parts 61*c*, it may be such that the control part 1 assumes an error in the case where the number of the "protrusion detecting parts 61*c*" having pixel values less than the threshold is less than a predetermined number. Accordingly, the error detection accuracy can be improved.

Since a hand is also decided as a part of a container in reality, there are cases where the area (e.g., total number of dots) of the container matches that of a different container by coincidence. With only the area of the container, there is a possibility that judgment is made as a different container to perform a process. Therefore, the protrusion detecting part 61*c* is provided.

In the case where the protrusion detecting part 61*c* cannot be detected, the control part 1 performs an error process.

However, for example, the control part 1 may decide that a commodity is sold by measure or a commodity is sold by number from a sticker (specific information) and further cause a selection screen for the container to be displayed, in the case where the sticker (specific information) specifying the sales type of the container has been detected within image data. Whether or not a container (commodity) placed on the placing part is a commodity sold by measure may be judged only with a sticker (specific information) specifying the sales type that is affixed to the container, without being limited to a case where the protrusion detecting part 61c cannot be detected. In this case, the sticker specifying the sales type that is affixed to the container may be, for example, a sticker of a figure specifying the sales type, a label printed with code information specifying the sales type, or the like. The sticker specifying the sales type that is affixed to the container may be affixed to any place on the container, as long as imaging of the place is possible.

Figure 12:
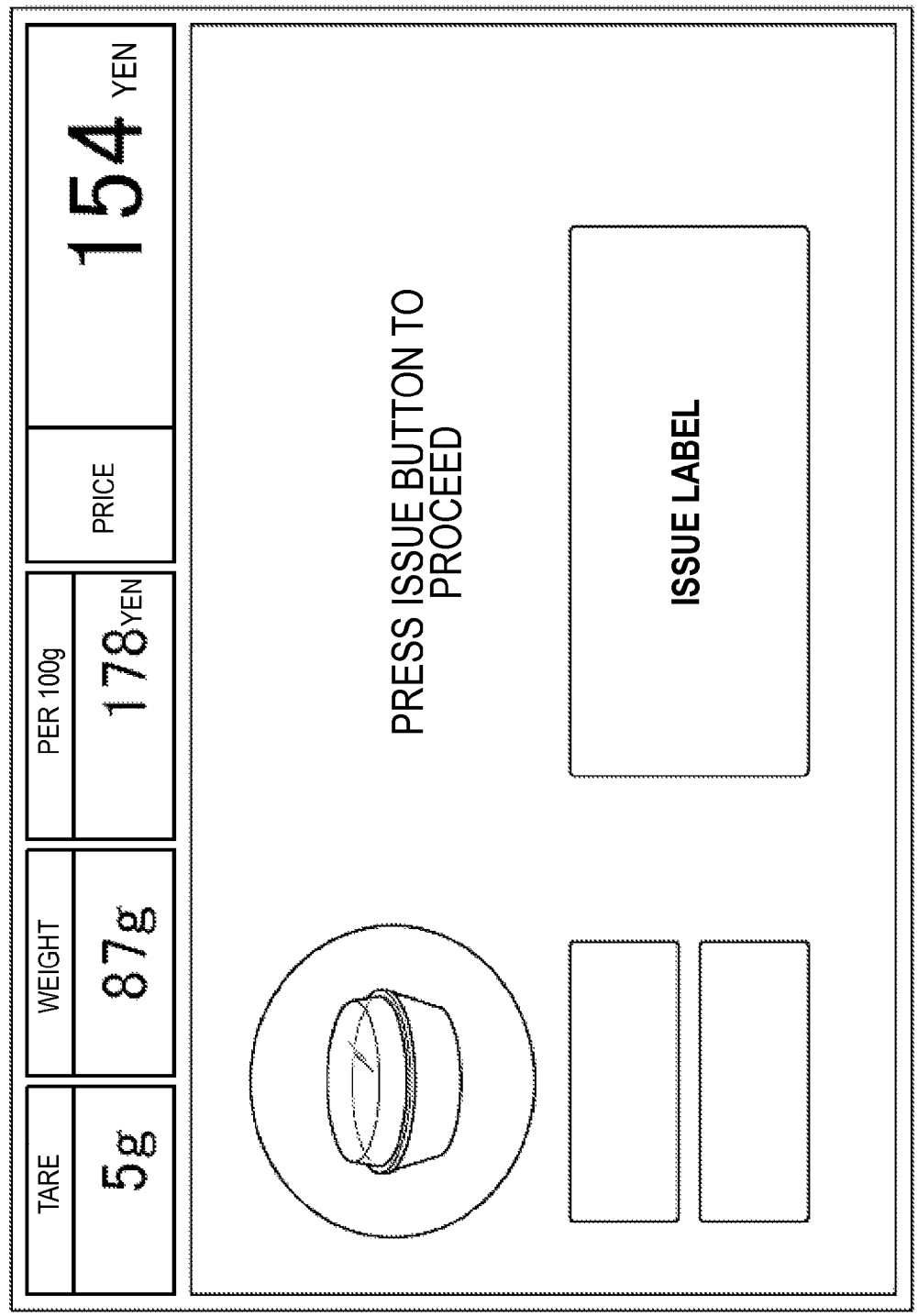
FIG. 12 is a view showing an example of a screen including a label issue button displayed in a display part of the commodity sales data processing device.

FIG. 12 is a view showing an example of a screen including a label issue button displayed in the display part of the commodity sales data processing device.

In the case where a commodity is placed on the measuring plate or the like of the measuring part, the weight of a tare, weight, the unit price (price per 100 g), the price, a picture showing the commodity or container, the label issue button, "Press issue button to proceed," and the like are displayed to urge checking of the container.

Figure 13:
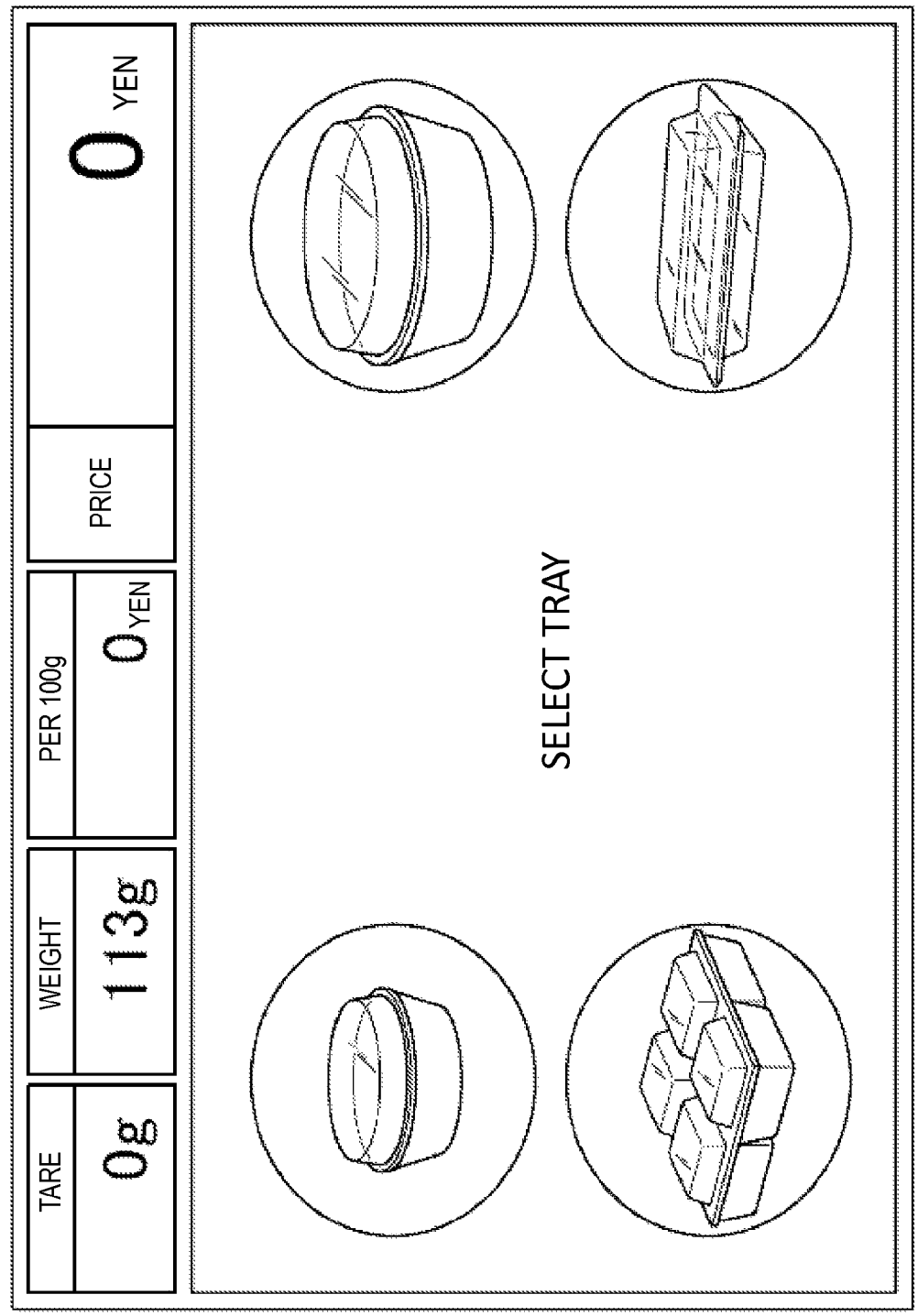
FIG. 13 is a view showing an example of a container (tray) selection screen displayed in the display part of the commodity sales data processing device.

FIG. 13 is a view showing an example of the container (tray) selection screen displayed in the display part of the commodity sales data processing device.

The control part displays one or a plurality containers memorized in the memorizing part such as the RAM as candidates to be selectable in the display part, in the case where the container cannot be specified from image data (picture data) of the imaged container of a commodity. Specifically, in the example shown in FIG. 13, picture data, illustration, or the like of a container for selling by measure or a container for selling by number is memorized in the memorizing part and is read from the memorizing part to be displayed in the display part by the control part. In the case where an operation of selecting a predetermined container has been performed on a touch panel or the like by an operator (customer or the like), the control part 1 can specify the container based on the operation.

Figure 14:
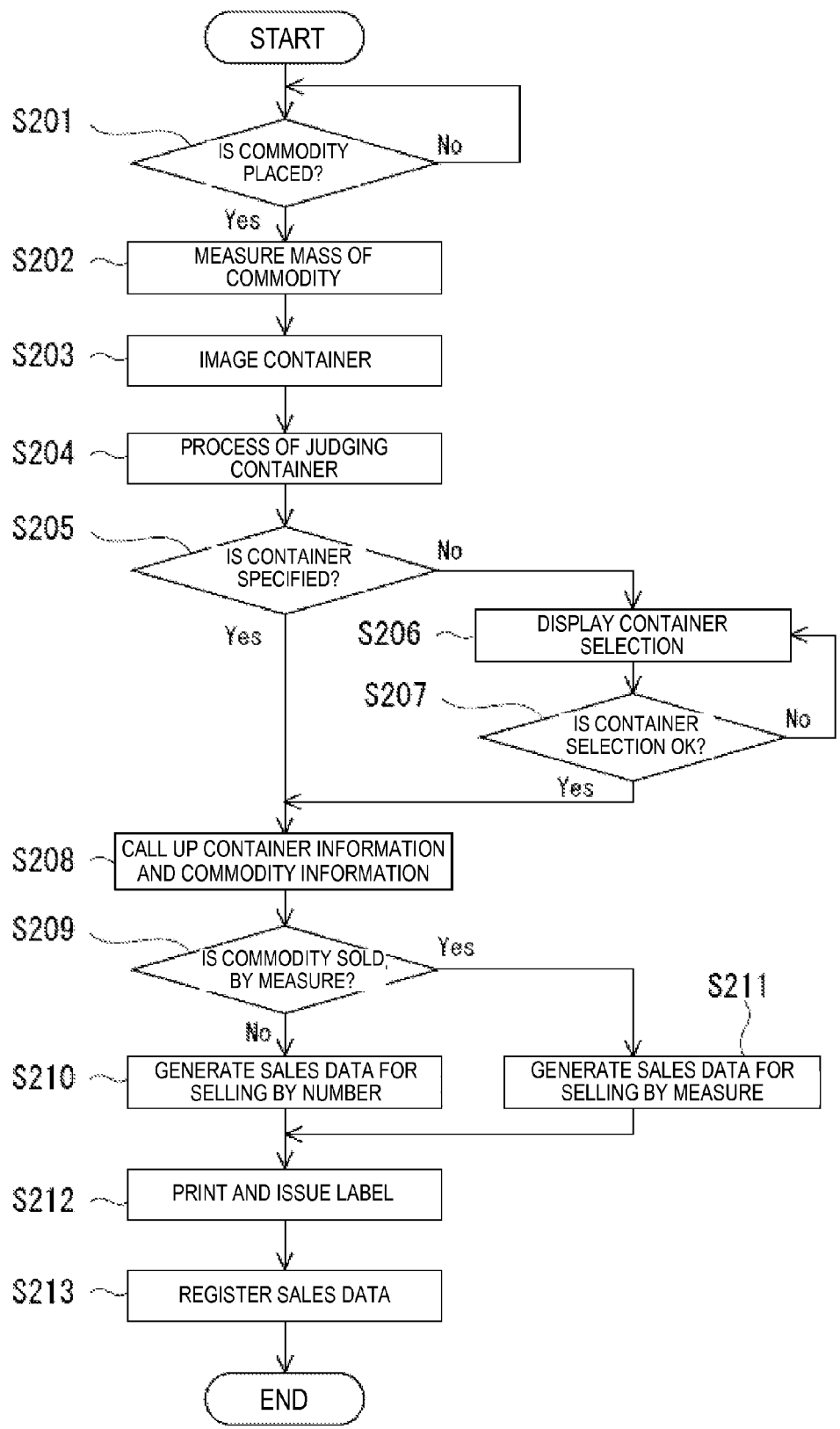
FIG. 14 is a flowchart showing an example of the behavior of the commodity sales data processing device.

FIG. 14 is a flowchart showing an example of the behavior of the commodity sales data processing device according to this embodiment. An example of the behavior of the commodity sales data processing device 100 according to this embodiment will be described.

In step S201, the control part 1 distinguishes whether or not an article held in a container has been placed on the measuring plate or the like of the measuring part 7 based on a signal from the measuring part 7 to proceed to a process of step S202 in the case where it is distinguished that an article has been placed or to repeat a process of step S201 in the case where an article has not been placed.

In step S202, the mass of the article is measured by the measuring part 7, and the control part 1 receives information (mass data) showing the mass of the article from the measuring part 7.

In step S203, the control part 1 performs a process of causing the imaging part 8 to image the container placed on the measuring plate or the like of the measuring part 7 and performs a process in which image data (picture data) of the container is received from the imaging part 8 and memorized in the memorizing part such as the RAM 3. After the image data (picture data) has been memorized in the memorizing part, it may be such that the image data (picture data) memorized in the memorizing part is read and the read image data is subjected to a binary coded process to acquire the area (identification information) of the container in a process of step S204 that follows, or it may be such that the image data (picture data) of the container is subjected to a binary coded process to acquire the area (identification information) of the container (with acquiring element) and the acquired area (identification information) of the container is memorized in the memorizing part such as the RAM 3 in this step S203.

In step S204, the control part 1 performs a process of judging the container (process of specifying the container) based on the image data from the imaging part 8. Specifically, the container judging part 101 performs a binary coded process on the image data of the container imaged by the imaging part 8 to acquire the area (identification information) of the container (with acquiring element). That is, the acquiring element acquires the identification information for identifying the container from the container. Based on the area (identification information) of the container acquired by performing the binary coded process of the image data and specific information specifying the container memorized in the container information memorizing part 32, the imaged container is specified (by judging element). In this embodiment, the container judging part 101 performs a process of specifying the container based on the size (area) of the tray (container) obtained from binary code picture data. Specifying the container may be through the number of dots in the binary code picture data or may be through a scheme of specifying with the external shape or the like (as identification information or specific information). As the information specifying the container memorized in the container information memorizing part 32 in this case, information of the external shape (contour shape or dimension information (of length, width, and height)) of the container, the color or design of the container surface, or the like may be memorized. A combination of a plurality of the various pieces of information may be memorized.

In step S205, the control part 1 distinguishes whether or not the container has been specified to proceed to a process of step S208 in the case where the container has been specified or proceed to a process of step S206 in the case where the container has not been specified.

In step S206, the control part 1 performs a process of displaying, in the display part 6, a plurality of candidates for the container memorized in the memorizing part (memory element) such as the RAM 3 to be selectable. Specifically, the control part 1 performs a process of displaying picture data, illustration, or the like of the container corresponding to container information in the display part 6.

In step S207, the control part 1 distinguishes whether or not the container has been selected by an operator (customer, for example) to proceed to the process of step S208 in the case where the container has been selected or proceed to the process of step S206 in the case where the container has not been selected.

In step S208, the control part 1 calls up (reads) container information and commodity information from the memorizing part such as the RAM 3.

In step S209, the control part 1 distinguishes whether or not a commodity associated with the container is a commodity sold by measure to proceed to a process of step S211 in the case of a commodity sold by measure or proceed to a process of step S210 in other cases.

In step S210, the control part 1 generates sales data for selling by number to proceed to a process of step S212. In generating the sales data for selling by measure, the number of articles is calculated based on mass data in which mass data of the container is subtracted from mass data of the measured commodity and unit mass data of the article, and the sales data of the commodity is generated based on the calculated number and the unit price of the article. In the case of a commodity in which a plurality of commodities are not held in the container, the sales data of the commodity is generated based on the unit price of the article without using the measured mass of the commodity.

In step S211, the control part 1 generates sales data for selling by measure to proceed to a process of step S212. In sales data generation for selling by measure, the sales data of the commodity is generated based on the mass data in which the mass data of the container is subtracted from the mass data of the measured commodity and the unit price of the article.

In step S212, the control part 1 causes the printing part 9 to perform a printing process in accordance with the sales data and performs a process of issuing a label. The label to be issued is issued by using a pasteboard-less label such that a label of a variable length in the label issuing direction is cut after printing, based on the print data volume in accordance with the commodity.

In step S213, the control part 1 performs a process of registering the sales data. Specifically, the control part 1 performs a process of memorizing the sales data in the memorizing part such as the RAM 3, a process of registering the sales data in a cash register machine, host computer, or the like via the communicating part 10, or the like.

A buyer (customer) of the commodity affixes the label to the container and pays a predetermined price via a clerk or directly with a self cash register machine (self POS register) at a location (checkout counter) in which the cash register machine (POS register) is installed. In the case of a self scale device including a checkout function (payment function) of the commodity sales data processing device 100, payment (self checkout) of the commodity to be purchased may be performed by the customer him/herself with the commodity sales data processing device 100.

In this embodiment, the type of container is specified based on image data (picture data) taken by the imaging part 8, and the type or sales type of an article (commodity) as content associated with the type of container in advance is specified based on the type of container. However, the form is not limited as such. For example, the type of article such as croquette or fried horse mackerel based on image data (picture data) taken by the imaging part 8. In this embodiment, the container placed on the placing part is imaged from above, but this is not limiting. For example, it may be such that the bottom part of an article (commodity) is imaged by the imaging part 8 (imaging element) to acquire image data (picture data), or the imaging direction of the imaging part 8 (imaging element) is toward the side end (on either the front, back, left, or right) of the container. In such cases, the shape of the bottom part of the container, the area of the bottom part, the color of the bottom part, or the like is container specific information (specific information) specifying the container, in the case where the imaging direction of the imaging part 8 (imaging element) is toward the bottom part. The shape on the side end of the container, the area of the side end, the color of the side end, or the like is container specific information (specific information) specifying the container, in the case where the imaging direction of the imaging part 8 (imaging element) is toward the side end (on either the front, back, left, or right) of the container.

Next, one specific example of the embodiment of the present invention will be described.

FIGS. 15A, 15B, and 15C are views for illustrating an example of the specific information. Specifically, FIG. 15A is a view showing an example of a sticker 70 (70a, 70b, and 70c) of a color or shape prescribed as the specific information. FIG. 15B is a view showing an example of a container 75 to which the sticker 70b is affixed as the specific information. FIG. 15C is a view showing an example of the container 75 to which the sticker 70c is affixed as the specific information.

In the embodiment described above, the specific information specifying the container memorized in the memory element is the area of the container (such as the number of dots corresponding to the area of the container). However, the form is not limited as such. The specific information may be, for example, the shape, color, or the like of the sticker 70, as shown in FIG. 15A. The specific information may be a label or the like printed with code information (e.g., one-dimensional code or two-dimensional code) specifying the sales type.

The color of a colored portion of the sticker 70 is a predetermined color such as, for example, red, blue, yellow, or green and is prescribed by the hue, color number, or the like. As the shape of the colored portion of a figure of the sticker 70, a quadrangle shape, a circular shape, a triangle shape, or a polygonal shape may be employed, for example.

In the sticker 70, the colored portion of the figure and a white area (white portion) surrounding the outside of the colored portion with a predetermined distance are formed. By providing the white portion, the color of a commodity and the color of the colored portion of the sticker 70 can be easily distinguished, and the shape with the distinguished color of the sticker 70 can be easily specified. The sticker 70 affixed to the container is affixed by a clerk, for example.

As the specific information, the shape and color of a sticker corresponding to a commodity sold by measure or a commodity sold by number are prescribed in advance to be each associated and memorized in the memory element. The sticker 70 showing the specific information is affixed to the container 75. The control part distinguishes a commodity sold by measure or a commodity sold by number based on the shape of the sticker 70 or the color of the sticker 70 imaged by the imaging part.

Accordingly, the control part can easily be distinguish a container of a commodity sold by measure or a container of a commodity sold by number based on the shape or color of the sticker 70 imaged by the imaging part as the specific information, even in the case where a container of a commodity sold by measure and a container of commodity sold by number have the same shape or area. In the case of a label or the like printed with code information (e.g., one-dimensional code or two-dimensional code) specifying the sales type, the code information printed on the label affixed to a container to specify the sales type in picture data taken by the imaging part is decoded to acquire the specific information (with the acquiring element). In the case of a one-dimensional code, a scanner device (scanner part) instead of the imaging part 8 may be used without using the imaging part 8. The commodity sales data processing device may be a device in which the imaging part 8 and a scanner device are combined.

Next, another specific example of the embodiment of the present invention will be described.

The memory element (memorizing part) memorizes, for example, specific information A1 specifying a container, specific information A2 specifying a container, and specific information A3 specifying a container. The specific information A1, A2, and A3 are associated with information showing a commodity sold by measure or a commodity sold by number and memorized in the memorizing part.

As the specific information A1 specifying a container, the area of the container, the number of dots corresponding to the area of the container, the shape of the container, or the like is memorized.

As the specific information A2 specifying a container, information relating to a sticker, e.g., the shape of the sticker or the color of the sticker, is memorized.

As the specific information A3 specifying a container, only the color of a sticker is memorized, for example. In this example, as described above, information relating to the area, shape, or the like of a container and information relating to a sticker are memorized in separate files in the memory element.

Next, an example of a procedure by the control part to decide whether a container is for a commodity sold by measure or a commodity sold by number will be described.
(I) First, the area of a container is decided. (II) Whether or not a sticker is affixed is distinguished. (III) In the case where a sticker is affixed, the shape of the sticker is decided. (IV) Then, the color of the sticker is decided.

The control part decides that the container is for a commodity sold by measure or a commodity sold by number with the procedure described above, for example.

The procedure of deciding that the container is for a commodity sold by measure or a commodity sold by number is not limited to the example described above. For example, it may be such that the order (priority) for deciding that the container is for a commodity sold by measure or a commodity sold by number is set by the setting element, and the control part performs the decision based on the priority set by the setting element.

Next, an example of the priority set by the setting element will be shown.

The specific information A1 specifying a container is third in priority, the specific information A2 specifying a container is first in priority, the specific information A3 specifying a container is second in priority, and specific information A4 specifying a container is fourth in priority.

In this example, deciding that a container is for a commodity sold by measure or a commodity sold by number from the area or the like of the container based on the specific information A1 specifying a container is third in priority, deciding that a container is for a commodity sold by measure or a commodity sold by number from the shape of a sticker based on the specific information A2 specifying a container is first in priority, deciding that a container is for a commodity sold by measure or a commodity sold by number from the color of a sticker based on the specific information A3 specifying a container is second in priority, and deciding that a container is for a commodity sold by measure or a commodity sold by number from a label printed with code information (e.g., one-dimensional code or two-dimensional code) specifying the sales type based on the specific information A4 specifying a container is fourth in priority.

The control part may decide that a commodity is sold by measure or a commodity is sold by number based on a combination of the shape and color of a sticker from picture data that has been taken. In this case, the sales type of a commodity can be increased by combining the type of container and the color or shape of a sticker, even in the case where the there are few types of containers. Therefore, the stock quantity and cost of a container can be reduced. In the case of making a judgment on the sales type of a commodity (container) from a combination of the color and shape of a sticker or a label printed with code information (e.g., one-dimensional code or two-dimensional code) specifying the sales type, the part of the container to which the sticker or label is affixed (or printed in advance) is not limited to the upper surface of the container and may be any one of the front and back surfaces, left and right surfaces, and bottom surface of the container. In this case, the imaging element is provided for imaging in a direction corresponding to the part of affixture.

As described above, the commodity sales data processing device 100 according to this embodiment registers sales data of an article held in a container.

Specifically, the commodity sales data processing device 100 includes the acquiring element (such as the imaging part 8 (imaging element) that images a container) for acquiring identification information for identifying a container from the container, the measuring part 7 (memory element) that measures the mass of an article, the memorizing part (such as the RAM 3) that memorizes specific information showing whether or not the sales type of a container is for selling by measure and specifying the container, the control part 1 (CPU), and the like. The control part 1 includes the container judging part 101 (container judging element) that specifies a container imaged by the imaging part 8 and judges whether or not the sales type of the specified container is for selling by measure, based on image data (picture data) of the container imaged by the imaging part 8 (imaging element) and specific information.

In this manner, the container judging part 101 of the commodity sales data processing device 100 can judge whether or not the sales type of a container imaged by the imaging part 8 is selling by measure. Therefore, an operation input or mistake in operation of information relating to a commodity by an operator can be eliminated.

The control part 1 of the commodity sales data processing device 100 includes the commodity registering part 102 (commodity registering element) and the like that generates and registers sales data of a commodity based on mass data of the commodity measured by the measuring part 7, in the case where the sales type of a container specified by the container judging part 101 (container judging element) is selling by measure.

Specifically, the commodity sales data processing device 100 specifies a container from image data (picture data) taken by the imaging part 8 and specifies whether the imaged container is for selling by measure or selling by number, based on the specified container, as a commodity sold by measure or a commodity sold by number. It is possible to generate and register sales data in accordance with the sales type of one of selling by measure and selling by number for the specified container, based on mass data of the commodity measured by the measuring part 7. Therefore, an operation input by an operator to designate the sales type as selling by measure or selling by number is unnecessary, and the commodity sales data processing device 100 capable of generating sales data reliably can be provided. As described above, the commodity sales data processing device 100 capable of realizing the effect according to the present invention with a simple structure can be provided.

In the memorizing part such as the RAM 3, a container holding an article and information (sales type) showing whether the container is for a commodity sold by measure or sold by number are associated and memorized. At the time of setting, information showing the sales type is associated and memorized in the memorizing part to correspond to the type of container in advance, according to the number of types of containers. Accordingly, easy setting is possible, and mistakes in setting are few.

In the embodiment of the present invention, the commodity sales data processing device 100 includes the display part 6 that displays one or a plurality of containers memorized in the memorizing part such as the RAM 3 as a candidate to be selectable, in the case where a container of a commodity imaged by the imaging part 8 has not been able to be specified in a process of specifying the container holding an article by the container judging part 101.

That is, the commodity sales data processing device 100 includes the display part 6 (display element) that displays, as a candidate, a container memorized in the memorizing part such as the RAM 3 as the memory element, in the case where judgment on a container cannot be made by the container judging element.

That is, even in the case where a container cannot be recognized from image data (picture data) of a commodity taken by the imaging part 8, the control part 1 performs a process of displaying a plurality of candidates for the type of container to be selectable in the display part 6, and the commodity registering part 102 can reliably generate and register sales data of the commodity based on information showing the type of container selected or input by an operator out of the plurality of candidates.

In the process of displaying a plurality of candidates for the type of container to be selectable in the display part 6 by the control part 1, the order of candidates for the type of container to be displayed may be such that containers close to the container recognized based on image data (picture data) of a commodity taken by the imaging part 8 are displayed in order to be selectable in the display part 6.

In the embodiment of the present invention, the container information memorizing part 32 memorizes mass data of a container. The commodity registering part 102 subtracts mass data of a container from mass data of a commodity measured by the measuring part 7 to generate and register sales data of an article based on the subtracted value. Therefore, the commodity sales data processing device 100 capable of appropriately generating and registering sales data such as the number or sold price of an article held in a commodity can be provided.

In this embodiment, the memorizing part such as the RAM 3 associates and memorizes specific information specifying a container, identification information identifying an article held in a container, unit mass data of an article, and the unit price of an article held in a container. With the commodity registering part 102 (commodity registering element), sales data of a commodity is generated based on mass data in which mass data of a container is subtracted from mass data of a measured commodity and the unit price of an article in the case where the judged container is for a commodity sold by measure based on specific information specifying the container judged by the container judging part 101 (container judging element), or the number of articles is calculated based on mass data in which mass data of a container is subtracted from mass data of the measured article and unit mass data of the article to generate sales data of the article based on the calculated number and the unit price of the article in the case where the judged container is not for a commodity sold by measure. Therefore, optimum sales data can be generated in accordance with the sales type, without an operator performing a troublesome operation.

In the embodiment of the present invention, whether or not a commodity is appropriately placed within the recognition range 61*a* of the imaging part 8 for the commodity is distinguished by the control part 1 based on image data (picture data) generated by the imaging part 8. In the case where it is distinguished that a commodity is not appropriately placed within the recognition range 61*a*, an error process is performed. Therefore, the commodity sales data processing device 100 capable of causing an operator to place a commodity within the recognition range 61*a* of the imaging part 8 and specifying a container of the commodity can be provided.

In this embodiment, each pixel of image data (picture data) taken by the imaging part 8 is binarized to clearly segment a container and a background portion other than the container. Accordingly, the area, shape, or the like of the container can be specified easily. The area of the container and the type of the container are associated and memorized in the memorizing part such as the RAM 3 in advance. By performing a binary coded process of image data (picture data) of a commodity taken by the imaging part 8, the control part 1 can obtain the area of the container placed on the measuring part 7 and can easily specify the type of container memorized in the memorizing part based on the area of the container.

Depending on the installed location of the device (environment in which the illuminance within a room is changed by external light), a change in illuminance within a room is conceivable due to the weather, time period such as morning, day, or night, room lighting, or the like, and the value of brightness, gamma, color, or the like of each pixel of image data (picture data) taken by the imaging part 8 changes greatly. For calibration in this embodiment, the placing surface (the color of which is a single color) is imaged in a state where an object such as a container is not placed, adjustment (correction) of the brightness, gamma, color, or the like of taken image data (picture data) is performed, and the value of the corrected (adjusted) brightness, gamma, color, or the like is set as the threshold for a binary coded process. Accordingly, it is possible to reliably identify a container from picture data taken by the imaging part 8 in a state where the container is placed on the placing surface. A correction value for lens distortion or the like other than for calibration may be memorized.

Specifically, for example, the placing surface is imaged by the imaging part 8 in each time period, and the threshold for a binary coded process is prescribed and memorized in the memorizing part based on picture data. The control part 1 can use the threshold for the binary coded process for each time period memorized in the memorizing part to perform the binary coded process of the picture data taken by the imaging part 8, specify the area of the container, and reliably specify the type of the container from the area of the container. It may be such that, upon memory in the memorizing part, the switching time of each usage time period of morning, day and night is scheduled with the value (threshold for the binary coded process) calibrated for each time period of morning, day and night, and the value (threshold for the binary coded process) calibrated for each time period is automatically switched based on the time that is kept track of by clock element and the switching time. It may be such that an illuminometer or the like is provided to the device, and the calibrated value (threshold for the binary coded process) is automatically switched based on the value shown by the illuminometer.

Embodiment 3

Next, a commodity sales data processing device according to Embodiment 3 will be described. In the description of respective drawings below, portions common to parts already described are denoted by the same reference numerals, and redundant descriptions are partly omitted.

FIGS. 16A and 16B are views showing an example of the configuration of the commodity sales data processing device 100 according to this embodiment. Specifically, FIG. 16A is an electrical functional block diagram, and FIG. 16B is a functional block diagram of a control part.

The commodity sales data processing device according to this embodiment includes a placing part such as a measuring plate of a measuring part on which a commodity is placed and an imaging part that images a commodity placed on the placing part. In the case where it is judged that a commodity is not positioned in a position in which imaging is possible on the placing part, a placing guidance for the commodity is informed. Specifically, the commodity sales data processing device informs that placement should be in a predetermined position of the measuring plate of the placing part, e.g., the center position of the measuring plate.

A position judging part 121 as position judging element judges whether or not a commodity is positioned in a position in which imaging is possible on the placing part (measuring plate of the measuring part 7). On the placing part, a placeable region in which a commodity can be placed on the placing part is set.

A container judging part 122 as container judging element specifies a container imaged by the imaging part 8 based on image data of the container imaged by the imaging part 8 and specific information specifying the container and judges the sales type of the specified container as selling by measure or otherwise, specifically, as selling by measure or selling by number.

A commodity registering part 123 registers a commodity placed on the placing part based on image data taken by the imaging part 8 and information of the commodity.

In the case where it is judged by the position judging part 121 that a commodity is positioned in a position in which imaging is possible on the placing part, the commodity registering part 123 registers the commodity placed on the placing part.

In this embodiment, the commodity registering part 123 generates and registers sales data of a commodity based on mass data of an article or the like measured by the measuring part 7, in the case where the sales type of a container specified by the container judging part 122 is for a commodity sold by measure. The commodity registering part 123 generates and registers the sales data of a commodity based on the sales type of a container specified by the container judging part 122, mass data of the commodity measured by the measuring part 7, and the unit price of an article memorized in the commodity information memorizing part.

The commodity registering part 123 performs a process of generating and registering sales data based on mass data in which mass data of a container is subtracted from mass data of a container holding an article measured by the measuring part 7 and the unit price of the article.

An informing part 124 displays, in the display part 6, image data obtained through imaging by the imaging part 8 and guidance to place an imaged commodity in a position in which imaging is possible on the placing part. Examples of informing including displaying in the display part 6 accordingly and emitting sound from a speaker or the like.

In the case where it is judged by the position judging part 121 that a commodity is not positioned in approximately the center of the placing part or a commodity is not within the placeable region, the informing part 124 informs that the commodity is to be placed correctly on the placing part.

In the case where a commodity is positioned in a predetermined position in the middle region of a predetermined width including approximately the center of the placing part to be within the placeable region and the commodity cannot be specified, the informing part 124 informs a candidate for the commodity placed on the placing part as information displayed to be selectable.

In a process of specifying a container holding an article with the container judging part 122, the control part 1 performs a process of displaying a plurality of candidates for the type of container memorized in the memorizing part such as the RAM 3 to be selectable in a touch panel-type display part 6, in the case where specific information specifying a container memorized in the container information memorizing part does not include information corresponding to the container of a commodity imaged by the imaging part 8.

In this embodiment, the type of container (tray) and the type of article held in the container (tray) are associated and memorized in the memorizing part. The type of container (tray) and sales type information are associated and memorized in the memorizing part.

Figure 17:
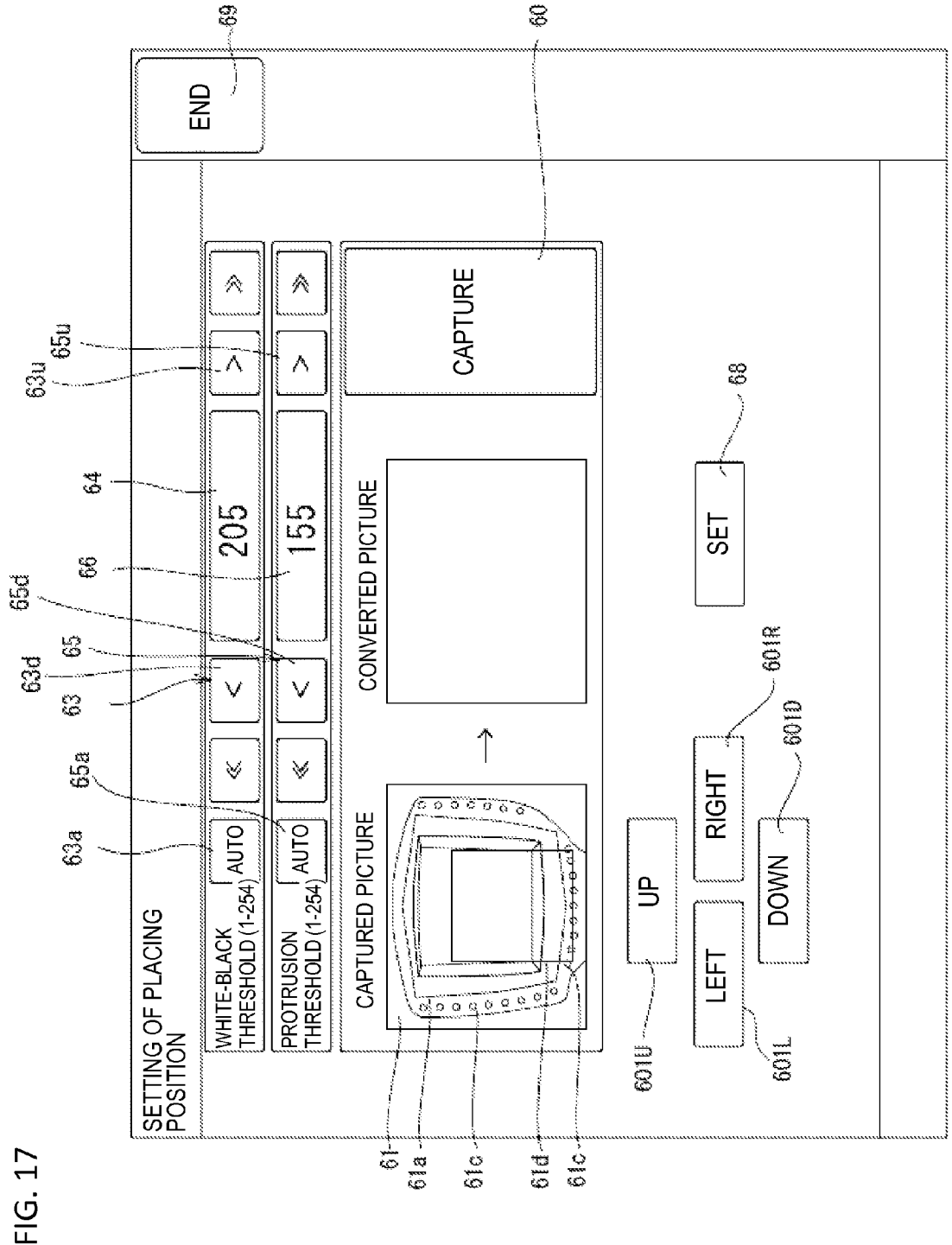
FIG. 17 is a view showing an example of a screen for setting a placing position.

FIG. 17 is a view showing an example of a setting screen for a placing position. The setting screen for the placing position includes a picture (the captured picture 61) of a commodity or the like imaged by the imaging part, a range 61*d* showing the size of a container or commodity, the plurality of protrusion detecting parts 61*c* provided around the recognition range 61*a*, operation buttons (up button 601U, down button 601D, left button 601L, and right button 601R) with which the position of the range 61*d* or the position of the protrusion detecting part 61*c* is adjusted, the setting button 68, and the like.

An example of a method of adjusting the position of the protrusion detecting part 61*c* will be described.

The configuration is such that the position of the protrusion detecting part 61*c* is adjusted by selecting the desired protrusion detecting part 61*c* and operating the operation button such as the up button 601U, the down button 601D, the left button 601L, or the right button 601R. A plurality of the protrusion detecting parts 61*c* may be selected to perform position adjustment.

An example of a method of adjusting the position of the range 61*d* showing the size of a container, commodity, or the like will be described.

The configuration is such that the position is adjusted by selecting the upper side, lower side, left side, or right side of the range 61*d* showing the size of a container, commodity, or the like and operating the operation button such as the up button 601U, the down button 601D, the left button 601L, or the right button 601R. More than one of the upper side, the lower side, the left side, and the right side may be selected to perform position adjustment.

In the case where the setting button 68 has been operated after the position adjustment, the position adjustment is memorized in the memorizing part, and the setting is reflected.

Figure 18:
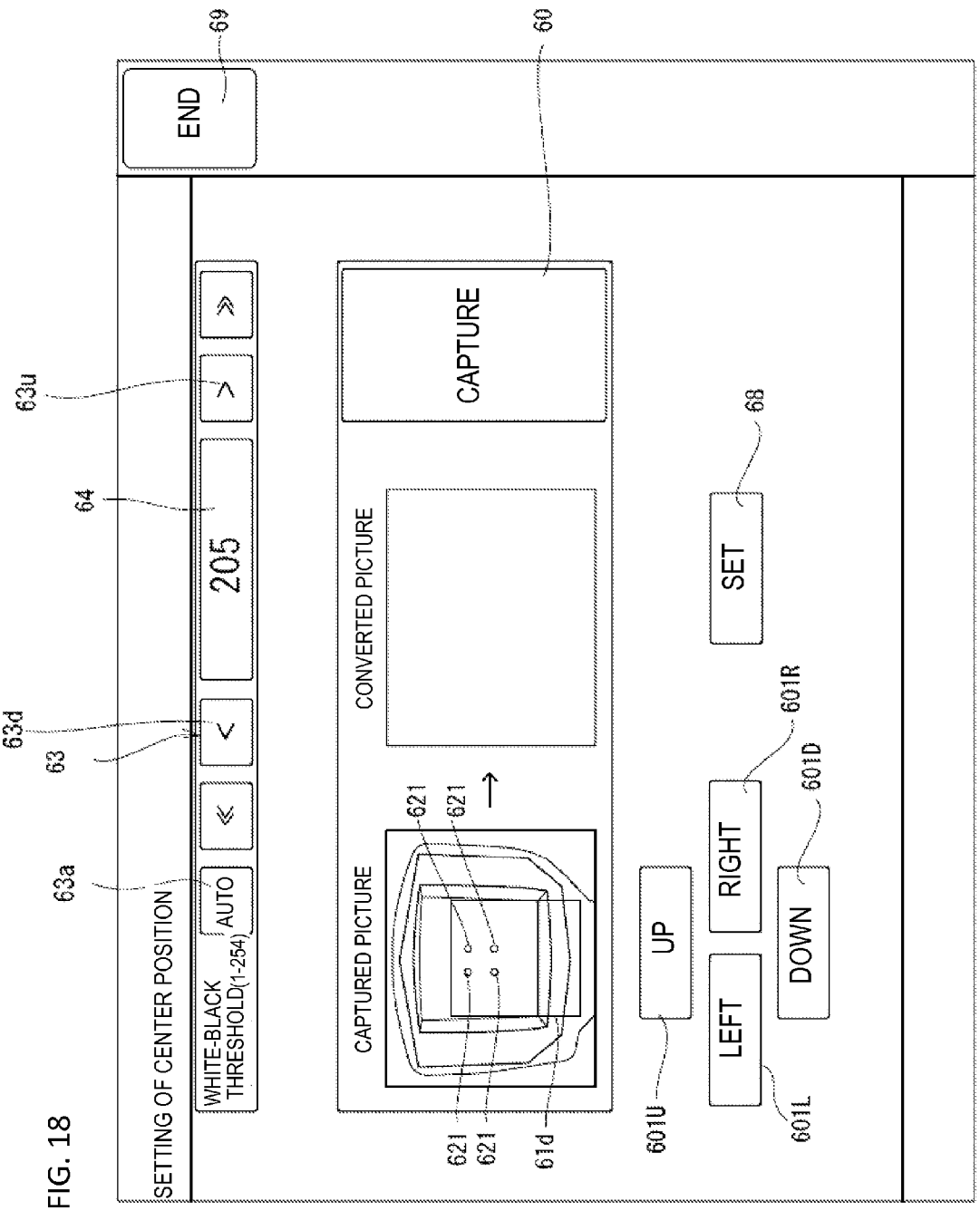
FIG. 18 is a view showing an example of a screen for setting approximately the center position of a region in which imaging is possible on the placing part.

FIG. 18 is a view showing an example of a setting screen in approximately the middle position of a region in which imaging is possible on the placing part.

Approximately the center position of the region in which imaging is possible on the placing part is configured to be settable. Approximately the center position of the region in which imaging is possible on the placing part is prescribed with one or a plurality of points 621. In this embodiment, as shown in FIG. 18, approximately the center position of the region in which imaging is possible on the placing part is prescribed by four points 621. Based on a change in pixel value at the point 621, whether or not a commodity, container, tray, or the like is positioned in approximately the center position of the region in which imaging is possible on the placing part can be judged.

The position of the point 621 can be adjusted by operating the operation button such as the up button 601U, the down button 601D, the left button 601L, or the right button 601R. A plurality of the points 621 may be selected to perform position adjustment. In the case where the setting button 68 has been operated after the position adjustment, the position adjustment is memorized in the memorizing part, and the setting is reflected.

Since the plurality of points 621 are provided in approximately the center position of the region in which imaging is possible on the placing part in the embodiment, movement of a commodity, container, tray, or the like near the center position can be detected based on a change in pixel value at each point 621.

Judgment on access of a commodity or the like to the region in which imaging is possible on the placing part of the commodity sales data processing device can be performed in the placeable region.

The timing at which a commodity is specified by the imaging part 8 may be before the commodity is placed on the placing part. For example, a commodity may be specified when the commodity is guided to a position in which imaging is possible on the placing part.

Figure 19:
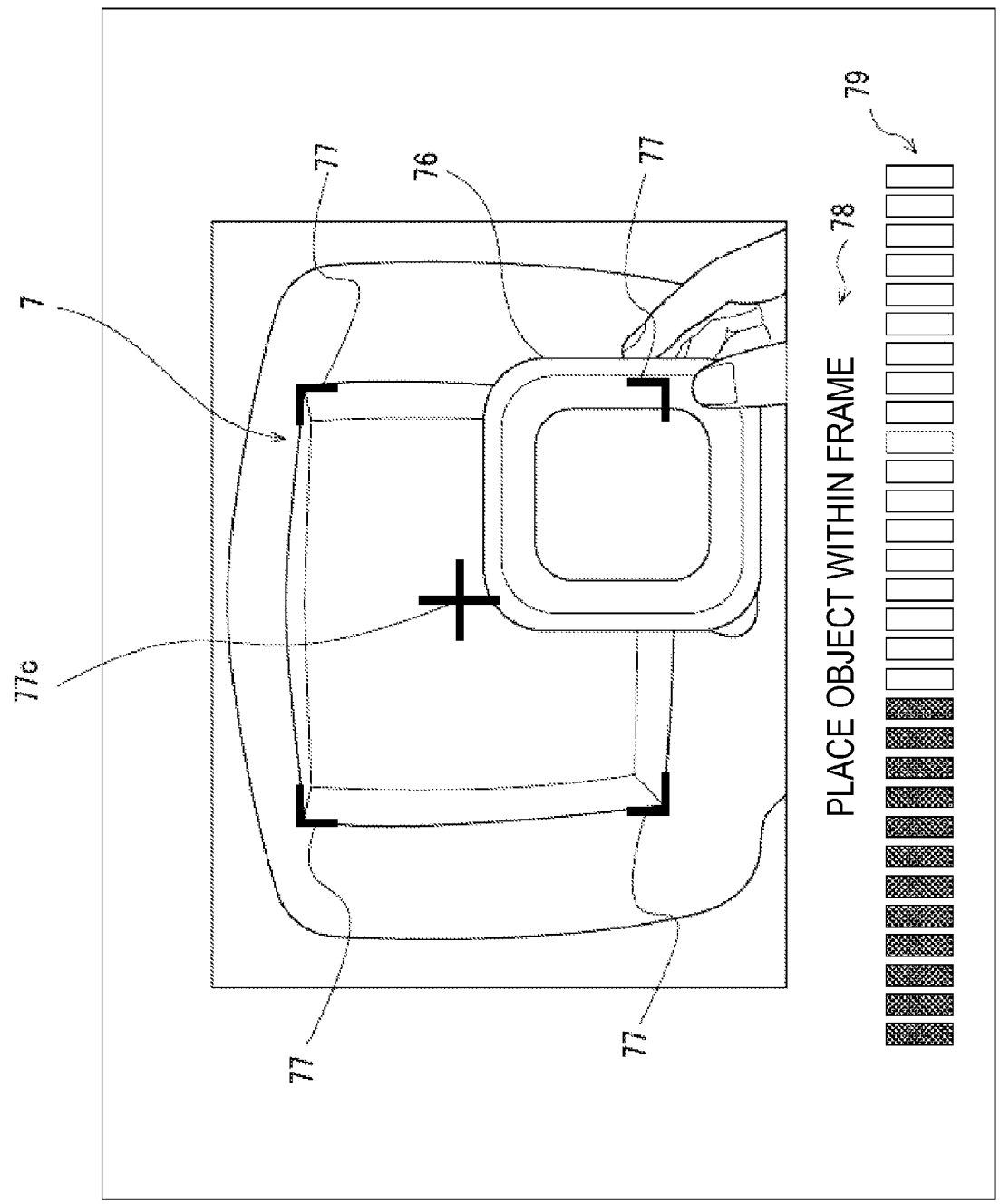
FIG. 19 is a view showing an example of a display screen upon placing a commodity or the like on the placing part.

FIG. 19 is a view showing an example of a display screen upon placing a commodity or the like on the placing part.

As shown in FIG. 19, the display part of the commodity sales data processing device displays image data taken by the imaging part, a frame 77 showing the placing position on the measuring plate (placing part) of the measuring part 7 for a commodity 76, a guiding part 78 for causing the imaged commodity 76 or the like to be placed in a position in which imaging is possible on the placing part, a state displaying part 79 such as a progress bar showing the degree of approach of a commodity to the center position of the placing part, and the like.

The position judging part of the control part decides whether or not the commodity 76 is arranged within the frame 77. In a middle part 77c of the frame 77, a point (the point 621 in FIG. 18) showing approximately the center position of the region in which imaging is possible on the placing part is prescribed in an invisible manner or the like. Based on a change in the pixel value of the point, whether or not a commodity, container, tray, or the like is positioned in approximately the center position of the placing part can be judged.

In the case where it is judged that the commodity is not positioned in a position in which imaging is possible on the placing part, a placing guidance for the commodity is displayed in the guiding part 78.

In the case where it is judged that the commodity is not positioned in approximately the center of the placing part or the commodity is not within the placeable region, informing is performed in the guiding part 78 so that the commodity is correctly placed on the placing part.

For the placing guidance, displaying is preferably performed to be superimposed on a video being taken.

The placing guidance is for guidance such that a desired area for placement can be specified visually. Dynamic displaying with a progress bar or the like until a correct position for placement is reached or displaying for support with a character or the like such as "slightly to the right," "slightly lower," "slightly higher," or "slightly to the left," may be performed.

When a commodity is positioned in the correct placing position, display or the like representing completion such as "It has been placed in the correct position." or "OK" may be performed.

A colored figure or the like may be superimposed on a commodity for a dynamic guidance. In this case, guidance may be such that the colored figure moves ahead in a direction in which a commodity is desired to be moved and blinks at the destination as a guide to the correct position.

The placing guidance is not limited to being for a commodity such as a tray and may be for a commodity packaged individually such as sushi. In this case, it may be such that displaying "OK" or the like on a guidance screen is performed on individually-packaged sushi of which an affixed label has been recognized, and an area in which a label cannot be recognized is encompassed with a red frame or the like to specify the area and inform that the commodity is to be placed again.

In the case where it is judged that a commodity is positioned in a position in which imaging is possible on the placing part, the commodity registering part registers the commodity placed on the placing part.

FIG. 13 is a view showing an example of a container (tray) selection screen displayed in the display part of the commodity sales data processing device.

In the case where a commodity, tray, or the like is positioned in a predetermined position in the middle region of a predetermined width including approximately the center of the placing part to be within the placeable region and the commodity cannot be specified, a candidate for the commodity placed on the placing part is informed as information displayed to be selectable, as shown in FIG. 13.

Information memorized as placing position information is the middle region, a placeable region with at least three sides, a recognition region for an affixed label, or the like.

As described above, the commodity sales data processing device according to this embodiment includes the placing part such as the measuring plate of the measuring part 7 on which a commodity is placed, imaging element (the imaging part 8) for imaging a commodity placed on the placing part, the position judging element (position judging part 121) for judging whether or not a commodity is positioned in a position in which imaging is possible on the placing part, and informing element (the informing part 124) for informing a placing guidance about a commodity in the case where it is judged by the position judging element that the commodity is not positioned in a position in which imaging is possible on the placing part.

In this manner, a placing guidance about a commodity is informed, in the case where whether or not an imaged commodity is placed in approximately the center of the placing part is judged by the position judging element and placement is not in approximately the center. Therefore, the recognition rate of the commodity can be increased, and a correct commodity registration can be performed.

The informing element (informing part 124) of the commodity sales data processing device according to the embodiment of the present invention performs a process of displaying, in the display part 6, image data taken by the imaging element (imaging part 8) and guidance for placing an imaged commodity in a position in which imaging is possible on the placing part.

Since an imaged picture and a placing guidance about a commodity are displayed in the display part 6 and informing is performed in this manner, a customer can easily see whether or not the commodity has been placed in the correct position, and the commodity can be placed in approximately the center of the placing part.

In the informing element (informing part 124) of the commodity sales data processing device according to the embodiment of the present invention, the placeable region in which a commodity can be placed on the placing part is set. In the case where it is judged by the position judging element that a commodity is not positioned in approximately the center of the placing part or a commodity is not within the placeable region, the informing element of the commodity sales data processing device performs informing so that the commodity is correctly placed on the placing part.

Therefore, since the judging element judges whether or not a commodity has been placed in the correct position of the placing part based on approximately the center and the placeable region of the placing part, the placing position for the commodity to be placed on the placing part can be judged correctly, and a customer can be appropriately informed of a placing guidance about the commodity.

In the case where a commodity is positioned in a predetermined position in the middle region of a predetermined width including approximately the center of the placing part to be within the placeable region and the commodity cannot be specified, the informing element (informing part 124) of the commodity sales data processing device according to the embodiment of the present invention informs a candidate for the commodity placed on the placing part as information displayed to be selectable.

Since the commodity placed on the placing part is selected out of candidates for the commodity by a customer in this manner, the commodity sales data processing device that can easily specify the commodity placed on the placing part can be provided.

The commodity sales data processing device according to the embodiment of the present invention further includes commodity information memory element (such as the RAM 3 or the ROM 2) for memorizing information of a commodity and commodity registering element for registering a commodity placed on the placing part based on image data taken by the imaging element (imaging part) and information of the commodity. In the case where it is judged by the position judging element (position judging part 121) that a commodity is positioned in a position in which imaging is possible on the placing part, the commodity registering element performs a process of registering the commodity placed on the placing part.

In this manner, the process of registering a commodity placed on the placing part is performed by the commodity registering element, in the case where the commodity is positioned in a position in which imaging is possible on the placing part. Therefore, the recognition rate of a commodity improves, and a correct commodity registration can be performed.

The embodiments of the present invention have been described above in detail with reference to the drawings. However, the specific configuration is not limited to these embodiments. The present invention also includes a change or the like in design without departing from the gist of the present invention.

It is possible to combine the described contents for the embodiments shown above with the respective drawings, as long as a contradiction or problem is not particularly present in an object, configuration, or the like.

The described contents for the respective drawings can each be an independent embodiment, and the embodiment of the present invention is not limited to one embodiment in which the respective drawings are combined.

EXPLANATION OF REFERENCE NUMERALS

1 Control part (CPU)
2 ROM (memorizing part, memory element)
3 RAM (memorizing part, memory element)
4 Auxiliary memorizing part
5 Operating part (operating element, touch panel)
6 Display part (display element, touch panel)
7 Measuring part (measuring element)
8 Imaging part (acquiring element, reading element, imaging element, scanner part (scanner device))
9 Printing part (printing element)
11 Audio output part (speaker)
31 Commodity information memorizing part (commodity information memory element)
32 Container information memorizing part (commodity information memory element)
100 Commodity sales data processing device (self sale device)
101 Container judging part (container judging element)
102 Commodity registering part (commodity registering element)
111 Type recognizing part
112 Quantity specifying part
113 Number calculating part
114 Judging part
115 Informing part
121 Position judging part
122 Container judging part
123 Commodity registering part
124 Informing part

What is claimed is:

1. A commodity sales data processing device that processes sales data relating to a commodity, the commodity sales data processing device comprising:
   a receiver on which a commodity is placed;
   a measurer that measures a mass of the commodity placed on said receiver;
   an imaging device that images the commodity placed on said receiver;
   a controller that registers the commodity based on the mass of the commodity measured by said measurer and a picture taken by said imaging device;
   a memory that stores commodity data including unit mass information of a commodity,
   wherein said controller includes:
      a quantity specifier that specifies a number of commodities based on the picture taken by said imaging device,
      a number calculator that calculates a number of commodities based on the mass of the commodity measured by said measurer and the commodity data stored in said memory,
      a judger that judges whether or not the number of commodities specified by said quantity specifier and the number of commodities calculated by said number calculator match, and
      an indicator that indicates a result of judgment by said judger.

2. The commodity sales data processing device according to claim 1, further comprising a display that displays an add button, the add button being operable to increase the number of commodities, when said judger has judged that the number of commodities specified by said quantity specifier and the number of commodities calculated by said number calculator do not match.

3. A commodity sales data processing device that processes sales data relating to a commodity and registers sales data of an article held in a container as the commodity, the commodity sales data processing device comprising:
   a receiver on which a commodity is placed;
   a measurer that measures a mass of the commodity placed on said receiver;
   an imaging device that images the commodity placed on said receiver;

a controller that registers the commodity based on the mass of the commodity measured by said measurer and a picture taken by said imaging device;

an acquirer that acquires identification information identifying the container; and a memory that stores specific information indicating whether or not the container is for a commodity sold by measure, wherein said controller includes container judger that judges whether or not the container is for a commodity sold by measure based on the identification information acquired by said acquirer, and said the specific information.

4. The commodity sales data processing device according to claim 3, wherein said acquirer includes the imaging device that images the container to acquire image data as the identification information, and said container judger judges whether or not the container is for a commodity sold by measure based on the image data acquired by said imaging device, and the specific information.

5. The commodity sales data processing device according to claim 4, wherein said receiver includes a flocked region at least in a region in which the container imaged by said imaging device is placed.

6. The commodity sales data processing device according to claim 3, wherein said acquirer includes a scanner that acquires code information from an affixed object affixed to the container, as the identification information for identifying the container, and said container judger judges whether or not the container is for a commodity sold by measure based on the code information acquired by said scanner, and the specific information.

7. A commodity sales data processing device that processes sales data relating to a commodity, the commodity sales data processing device comprising:

a receiver on which a commodity is placed;

a measurer that measures a mass of the commodity placed on said receiver;

an imaging device that images the commodity placed on said receiver; and a controller that registers the commodity based on the mass of the commodity measured by said measurer and a picture taken by said imaging device, wherein said controller includes a position judger that judges whether or not the commodity is positioned in a position in which imaging is possible in said receiver, and an indicator that indicates a placing guidance about the commodity, when said position judger has judged that the commodity is not positioned in the position in which imaging is possible in said receiver, wherein said indicator displays, on a display, the picture taken by said imaging device and guidance for placing the imaged commodity in the position in which imaging is possible in said receiver.

8. The commodity sales data processing device according to claim 7, wherein a placeable region in which a commodity can be placed on said receiver is set, and said indicator indicates that the commodity is to be placed correctly on said receiver, when said position judger has judged that the commodity is not positioned in approximately a center of said receiver or said commodity is not within the placeable region.

* * * * *

UNITED STATES PATENT AND TRADEMARK OFFICE
CERTIFICATE OF CORRECTION

| | | |
|---|---|---|
| PATENT NO. | : 9,123,214 B2 | Page 1 of 1 |
| APPLICATION NO. | : 14/563316 | |
| DATED | : September 1, 2015 | |
| INVENTOR(S) | : Nishino | |

It is certified that error appears in the above-identified patent and that said Letters Patent is hereby corrected as shown below:

In the Claims

Column 31, line 12 (claim 3) please change "and said the" to -- and the --.

Signed and Sealed this
Third Day of May, 2016

Michelle K. Lee
*Director of the United States Patent and Trademark Office*